United States Patent
Schwartz et al.

(10) Patent No.: US 9,330,251 B1
(45) Date of Patent: *May 3, 2016

(54) AUTHENTICATING FERROELECTRIC RANDOM ACCESS MEMORY (F-RAM) DEVICE AND METHOD

(71) Applicant: Cypress Semiconductor Corporation, San Jose, CA (US)

(72) Inventors: Kurt S. Schwartz, Colorado Springs, CO (US); Michael Borza, Ottawa (CA); Qidao Li, Colorado Springs, CO (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,971

(22) Filed: Nov. 12, 2013

Related U.S. Application Data

(63) Continuation of application No. 13/355,145, filed on Jan. 20, 2012, now Pat. No. 8,583,942.

(60) Provisional application No. 61/439,696, filed on Feb. 4, 2011.

(51) Int. Cl.
  *G06F 12/14* (2006.01)
  *G06F 17/30* (2006.01)
  *G06F 21/44* (2013.01)
  *G06F 21/78* (2013.01)

(52) U.S. Cl.
  CPC .............. *G06F 21/445* (2013.01); *G06F 21/78* (2013.01)

(58) Field of Classification Search
  CPC .............. H04L 9/3273; H04L 63/0492; H04L 63/0869; H04L 2209/80; H04L 2209/805; G06F 21/34; G06F 21/35; G06F 21/445; H04W 12/06
  USPC .......... 380/255, 259; 713/150, 168, 169, 182; 726/2, 26, 27
  See application file for complete search history.

(56) References Cited

U.S. PATENT DOCUMENTS

| | | | |
|---|---|---|---|
| 4,799,061 A | 1/1989 | Abraham et al. | |
| 5,225,664 A | 7/1993 | Iijima | |
| 6,393,567 B1 | 5/2002 | Colnot | |
| 2004/0268136 A1 | 12/2004 | Mitsuishi | |
| 2005/0268058 A1 | 12/2005 | Drasnin et al. | |
| 2008/0106386 A1* | 5/2008 | Li et al. ......................... | 340/10.5 |
| 2008/0263367 A1 | 10/2008 | Tatebayashi et al. | |
| 2008/0313471 A1 | 12/2008 | Huang et al. | |
| 2009/0222910 A1 | 9/2009 | Le Bihan et al. | |
| 2009/0296479 A1 | 12/2009 | Yamaoka et al. | |

FOREIGN PATENT DOCUMENTS

| | | | |
|---|---|---|---|
| JP | 2005275654 | 10/2005 | |
| JP | 2005275654 A | * 10/2005 | .............. G06F 12/14 |

OTHER PUBLICATIONS

U.S. Appl. No. 13/355,145: "Authenticating Ferroelectric Random Access Memory (F-RAM) Device and Method" Kurt S. Schwartz et al., filed Jan. 20, 2012; 104 pages.
USPTO Non Final Rejection for U.S. Appl. No. 13/355,145 dated Apr. 26, 2013; 10 pages.
USPTO Notice of Allowance for U.S. Appl. No. 13/355,145 dated Jul. 22, 2013; 14 pages.
SIPO Office Action for Chinese Application No. 201210025501.6 dated Jan. 13, 2015; 4 pages.
SIPO Office Action for Chinese Application No. 201210025501.6 dated Jun. 5, 2014; 5 pages.

* cited by examiner

*Primary Examiner* — Joseph P Hirl
*Assistant Examiner* — Kalish Bell

(57) ABSTRACT

A memory device including a ferroelectric memory array is described. In one embodiment, the ferroelectric memory array includes a user memory space. The memory device includes control logic configured to provide external read and write access for a host system to the user memory space upon authentication between the host system and the memory device. The host system accesses the user memory space and communicates with the control logic through address, data and control buses. The memory device further includes memory interface configured to interface between the address, data and control buses and the control logic, and through which the host system communicates with the control logic, and a cipher engine in communication with the control logic and the memory interface, the cipher engine comprising a random number generator and an encryption/decryption block. Other embodiments are also described.

19 Claims, 29 Drawing Sheets

Table 1

| Register | Address | \\multicolumn{16}{c}{Bit Number} |
| --- | --- | --- |

| Register | Address | 15 | 14 | 13 | 12 | 11 | 10 | 9 | 8 | 7 | 6 | 5 | 4 | 3 | 2 | 1 | 0 |
| --- | --- | --- | --- | --- | --- | --- | --- | --- | --- | --- | --- | --- | --- | --- | --- | --- | --- |
| Status Register | 0X0000C | - | - | - | - | - | - | - | - | - | - | - | UP FAIL | EIP | Err | FAIL | READY |
| Fail Counter Register | 0X0000B | FC15 | FC14 | FC13 | FC12 | FC11 | FC10 | FC9 | FC8 | FC7 | FC6 | FC5 | FC4 | FC3 | FC2 | FC1 | FC0 |
| Lock Register | 0X0000A | - | - | - | - | - | - | - | - | - | - | ML | LAK | LUK | LAP | LUP | LI |
| Control Register | 0X00009 | - | - | - | - | - | - | - | - | - | - | - | TXACT | EB | ADM | AE | EE |
| Administration Register | 0X00008 | - | C1 | C0 | T1 | T0 | UP | U3 | U2 | U1 | U0 | EP | EA | EC | MF1 | MF0 | RF |
| Authentication Data Buffer (8 registers) | 0X00000-0X00007 | D15 | D14 | D13 | D12 | D11 | D10 | D9 | D8 | D7 | D6 | D5 | D4 | D3 | D2 | D1 | D0 |

*Fig. 1B*

Table 2

| C1 | C0 | Number of Accesses |
| --- | --- | --- |
| 0 | 0 | 1024 |
| 0 | 1 | 16384 |
| 1 | 0 | 131072 |
| 1 | 1 | Unlimited |

*Fig. 1C*

Table 3

| T1 | T0 | Authentication Time |
| --- | --- | --- |
| 0 | 0 | 100ms |
| 0 | 1 | 1s |
| 1 | 0 | 10s |
| 1 | 1 | Unlimited |

*Fig. 1D*

Table 4

| U3 | U2 | U1 | U0 | CSP To Be Updated |
| --- | --- | --- | --- | --- |
| 0 | 0 | 0 | 1 | HostID |
| 0 | 0 | 1 | 0 | MemID |
| 0 | 0 | 1 | 1 | PWDU1 |
| 0 | 1 | 0 | 0 | PWDU2 |
| 0 | 1 | 0 | 1 | PWDR |
| 0 | 1 | 1 | 0 | PWDW |
| 0 | 1 | 1 | 1 | PWDA1 |
| 1 | 0 | 0 | 0 | PWDA2 |
| 1 | 0 | 0 | 1 | PWDADM |
| 1 | 0 | 1 | 0 | KEYU |
| 1 | 0 | 1 | 1 | KEYA |

*Fig. 1E*

Table 5

| MF1 | MF0 | Number of Failed Authentication Attempts |
| --- | --- | --- |
| 0 | 0 | 100ms |
| 0 | 1 | 1s |
| 1 | 0 | 10s |
| 1 | 1 | Unlimited |

*Fig. 1F*

AUTHENTICATING FERROELECTRIC RANDOM ACCESS MEMORY (F-RAM) DEVICE AND METHOD

RELATED APPLICATION

The present invention claims priority from U.S. Provisional Application No. 61/439,696 filed Feb. 4, 2011, and is incorporated herein by reference in its entirety for all purposes as if fully set forth herein.

COPYRIGHT NOTICE/PERMISSION

A portion of the disclosure of this patent document contains material which is subject to copyright protection. The copyright owner has no objection to the facsimile reproduction by anyone of the patent document of the patent disclosure as it appears in the United States Patent and Trademark Office patent file or records, but otherwise, reserves all copyright rights whatsoever. The following notice applies to the software and data described below, inclusive of the drawing figures where applicable: Copyright© 2010 Ramtron International Corporation.

BACKGROUND OF THE INVENTION

The present invention relates, in general, to the field of ferroelectric random access memory (F-RAM) integrated circuit devices and devices incorporating FRAM memory arrays. More particularly, the present invention relates to an F-RAM authenticating memory device and method providing secure mutual authentication between a Host system and a memory in order to gain read/write access to the F-RAM user memory contents.

Various types of memory technologies are currently available including dynamic random access memory (DRAM) devices which are implemented utilizing a volatile, dynamic memory cell architecture, typically with each cell comprising a single transistor and capacitor. They are "volatile" in the sense that upon power down, the memory contents are lost and "dynamic" in the sense that they must be constantly refreshed to maintain the charge In the cell capacitor.

On the other hand, static random access memory (SRAM) devices are designed utilizing a volatile static memory cell architecture. They are considered to be "static" in that the contents of the memory cells need not be refreshed and the memory contents may be maintained indefinitely as long as power is supplied to the device. The individual memory cells of an SRAM generally comprise a simple, bi-stable transistor-based latch, using four, six or more transistors, that is either set or reset depending on the state of the data that was written to it. SRAM provides much faster read and write access time than DRAM.

In addition to DRAM and SRAM memories, various types of non-volatile memory devices are also currently available, by means of which data can be retained without continuously applied power. These include, for example, floating gate devices such as erasable programmable read only memory ("EPROM") devices, including electrically erasable ("EEPROM") devices, and Flash memory. While providing non-volatile data storage, their relatively slow access times (and in particular their very slow "write" times) present a significant disadvantage to their use in certain applications. In contrast, ferroelectric random access memory (F-RAM) devices such as those available from Ramtron International Corporation, assignee of the present invention, provide non-volatile data storage through the use of a ferroelectric dielectric material which may be polarized in one direction or another in order to store a binary value. The ferroelectric effect allows for the retention of a stable polarization in the absence of an applied electric field due to the alignment of internal dipoles within the Perovskite crystals in the dielectric material. In operation, F-RAM devices exhibit generally symmetric read/write times and faster write times than that of EPROM, EEPROM or Flash memory.

With respect to authenticating memory devices, the relatively slower write time of floating gate nonvolatile memories may result in less secure critical security parameter (CSP) updates since there is significantly more time to interfere with a CSP update when it is committed to non-volatile memory. Due to its faster write times, using F-RAM significantly reduces the time available to interfere with a CSP update.

Further, floating gate non-volatile memories exhibit a very distinctive write vs. read current profile that can be used in side channel attacks in an attempt to compromise CSPs. In comparison F-RAM's read vs. write current signature is balanced. Moreover, the erasure cycle of floating gate memory technologies is inherently slow when compared to that of F-RAM devices.

SUMMARY OF THE INVENTION

The authenticating F-RAM memory device disclosed herein allows access to the memory contents only after the device has been properly authenticated using an established authentication procedure. The authentication procedure disclosed utilizes secure encryption keys/passwords and Host/user ID's stored in non-volatile ferroelectric memory (F-RAM) and are referred to as critical security parameters, or CSPs.

Existing authentication protocols generally require significantly more processing power than the technique disclosed herein or otherwise compromise on security. In comparison/the unique device and technique of the present invention uses only an Advanced Encryption Standard AES128 encryption module in conjunction with a random number generator and basic exclusive OR (XOR) functions in order to achieve a secure algorithm with a relatively small amount of processing.

In accordance with the representative embodiment disclosed/the authentication procedure can allow two roles/one as a standard user that can only access the memory after a successful authentication/or as an administrator/that in addition to accessing the memory, can also modify or lock the CSPs. The device of the present invention can be configured to require reauthentication after a certain period of time has expired/after a certain number of accesses have been performed, or a combination of both. The Host can also end a successful authentication at any time through a control register. This configuration can be configured by the administrator.

The authentication procedure utilized in the representative embodiment disclosed utilizes the ability of the device to generate its own true hardware derived random number from a true hardware random number generator (THRNG). It should be noted that conventional hardware random number generators may not generate a sufficiently high degree of randomness. The random numbers so generated are then combined with an implementation of the AES128 Advanced Encryption Standard adopted by the National Institute of Standards and Technology (NIST) and are used in the device's authentication algorithm. This algorithm ensures that the same data will never be transmitted twice across multiple authentications, even when using the same CSPs.

If the security of the device is being compromised, the Host system or device can respond by erasing the memory array contents. This can be done by the associated Host system using a dedicated device pin or an erase command. The device can also erase the memory contents itself if too many failed authentications have been attempted. Device erasure is designed to operate as quickly as possible, e.g. within 100 ms for a 2 Mb array. Access to the device is not allowed until the erase procedure has been completed, even if the device is powered down while the erase procedure is in progress.

The authenticating F-RAM memory device disclosed herein also contains built in self-test (BIST) circuitry to ensure that the critical security elements (e.g. the THRNG and the AES128 block) are operating properly. A status register is used to communicate to the Host system if the BIST routines have passed or failed. BIST is automatically performed at device power-up and after a certain number of authentication attempts. The BIST function may also be initiated by the Host system at any time through a control register.

More particularly disclosed herein is an F-RAM memory device for applications that require secure mutual authentication between a Host system and the memory to gain read/write access to the F-RAM user memory contents. In the representative embodiment disclosed, a mutual authentication algorithm is provided that uses a random number generator, AES128 encryption/decryption, and critical security parameters (CSPs) stored in the F-RAM memory in conjunction with a non-volatile F-RAM counter to log the number of failed authentication attempts.

Further provided herein is an algorithm that allows CSPs stored in F-RAM to be updated securely together with an F-RAM erase procedure that can destroy the stored memory content and CSPs quickly as required. A true hardware random generator as disclosed herein is used for the authentication and CSP update protocols and all security algorithms are hardcoded in logic gates as opposed to firmware rendering the device potentially much more difficult to compromise.

The present invention has particular applicability to standalone secure memory products of any memory density (whether utilizing parallel or serial memory interfaces), radio frequency identification (RFID) products that require secure storage of data or any other product requiring data security.

Specifically disclosed herein is an authenticating memory device configured to be coupled to an associated host system. The memory device comprises a ferroelectric memory array comprising a user memory space and a configuration memory space. The memory device further comprises control logic configured to be coupled between the host system and the ferroelectric memory array wherein the control logic is operable to provide access to the user memory space upon mutual authentication between the host system and the memory device.

Further specifically disclosed herein is a method for providing authentication between a host system and a memory device which comprises providing a ferroelectric memory array comprising a user memory space and a configuration memory space. Control logic is coupled between the host system and the ferroelectric memory array and access is provided to the user memory space upon mutual authentication between the host system and the memory device.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 1B is a table illustrative of a representative organization of the CMOS Register Map of the preceding figure;

FIG. 1C is a table illustrative of the settings for a representative number of accesses before a current authentication ends;

FIG. 1D is a table illustrative of the settings for a representative time until a current authentication ends;

FIG. 1E is a table illustrative of a representative critical security parameters (CSP) update selection;

FIG. 1F is a table of representative settings for a maximum number of failed authentication attempts in accordance with the technique of the present invention;

DESCRIPTION OF A REPRESENTATIVE EMBODIMENT

Figure 1A:
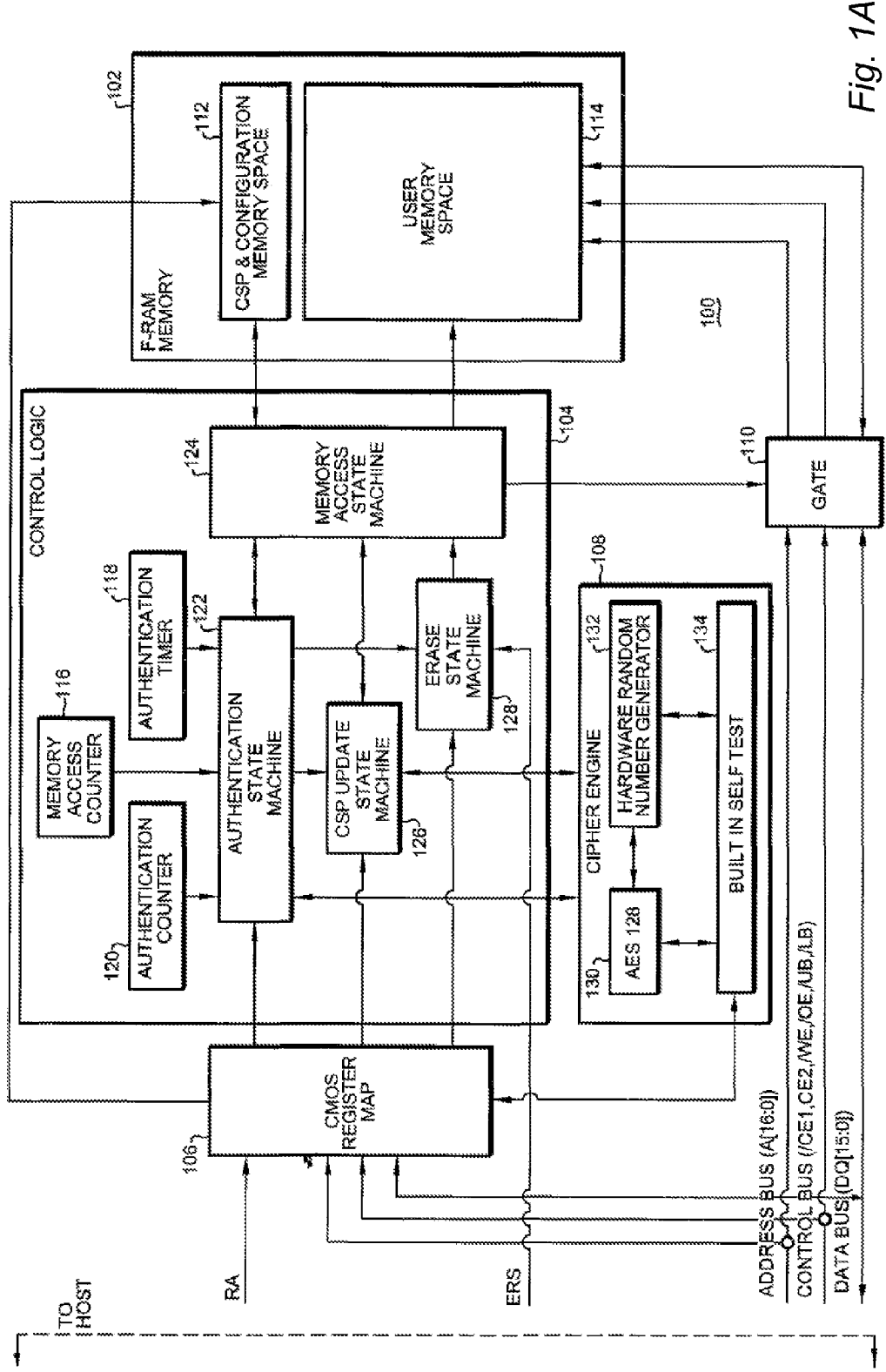
FIG. 1A is a functional block diagram of a representative embodiment of an F-RAM authenticating memory device in accordance with the present invention.

With reference now to FIG. 1A, a functional block diagram of a representative embodiment of an F-RAM authenticating memory device 100 (hereinafter also referred to as the "Device") in accordance with the present invention is shown. The device 100 functions to allow for mutual authentication with a Host system (not shown).

The device 100 comprises, in pertinent part, an FRAM memory array 102, a control logic portion 104, a complementary metal oxide semiconductor (CMOS) register map 106, a cipher engine 108 and a gate 110. In the particular implementation of the device 100 shown, the F-RAM memory array 102 comprises a critical security parameter (CSP) and configuration memory space 112 as well as a general user memory space 114.

The control logic portion 104 comprises a memory access counter 116, an authentication timer 118 and an authentication counter 120 providing inputs to an authentication state machine 122. The authentication state machine 122 is bidirectionally coupled to a memory access state machine 124 as well as providing an input to a CSP update state machine 126 and an erase state machine 128.

The authentication state machine 122 and the CSP update state machine 126 are bidirectionally coupled to the cipher engine 108 which comprises an AES 128 random number generator 130, a hardware random number generator 132 and a built in self test (BIST) block 134 all of which are bidirectionally coupled together. The CMOS register map 106 receives an RA input (as will be more fully described hereinafter) as well as being coupled to the device 100 address, control and data buses as shown. The CMOS register map 106 supplies inputs to the CSP and configuration memory space 112, the authentication state machine 122, the CSP update state machine 126 and the erase state machine 128 in addition to being bidirectionally coupled to the BIST block 134.

The authentication state machine 122, the CSP update state machine 126 and the erase state machine 128 each supply inputs to the memory access state machine 124 which is, in turn, bidirectionally coupled to the CSP and configuration memory space 112 and provides an input to the user memory space 114. The erase state machine 128 receives an erase signal (ERS) as will also be more fully described hereinafter. The memory access state machine 124 controls the gate 110 which couples the device 100 address, control and data buses to the user memory space 114 of the F-RAM memory array 102.

Functionally, the F-RAM Authenticating Memory Device 100 of the present invention is a device that allows mutual authentication between a Host system and the Device. In operation, this means that the authentication algorithm disclosed herein allows the Host to confirm it is communicating with a specific Device 100 and it also allows the Device to confirm it is communicating with a specific Host. If the Host can successfully complete the authentication procedure with the Device, the Device will grant access to additional information. Access to this additional information is effectively blocked until the Host can successfully authenticate itself to the Device. If the authentication algorithm is followed as disclosed herein, then the Device can also authenticate itself to the Host, so the Host can be ensured it is communicating with a specific Device 100.

The authentication algorithm disclosed herein ensures, through encrypted transmissions between the Host and the Device, that the same data is never transmitted twice for subsequent authentications using the same critical security parameters (CSPs), e.g. Host/memory identifiers, passwords, and encryption keys, to prevent malicious authentication.

While the exemplary implementation of the Device 100 described and disclosed herein does not specifically utilize a mode that allows encrypted data transmission once the device is authenticated, (for instance, to secure the data read from or written to the F-RAM User Memory), the algorithms could nevertheless be easily adapted to allow this specific mode of operation as well. For the Device, it is deemed sufficient to not include this mode of operation. The Host can store encrypted information in the F-RAM User Memory, but this information will be transmitted without any additional encryption once the authentication procedure completes successfully.

With respect to the representative embodiment of the present invention disclosed herein, the following terminology is utilized in describing its functional aspects:

XOR(A,B) A bitwise exclusive OR logic operation that exclusive or's A with B.

{A,B}: A concatenation operation that concatenates A with B. If A is a 64-bit number and B is a 64-bit number, the result is a 128-bit number with A being the most significant bits and B being the least significant bits.

E(A,B): An encryption operation that encrypts plaintext data A with encryption key B. The result is a 128-bit length ciphertext. In the ensuing representative description both A and B will be 128-bit numbers and the encryption protocol is assumed to be AES128.

D(A,B): A decryption operation that decrypts cipher text data A with encryption key B. The result is a 128-bit length plaintext. In the ensuing representative description both A and B will be 128-bit numbers and the decryption protocol is assumed to be AES128.

The interface to the user authentication is performed through a CMOS Register Map 106.

Access to the CMOS Register Map 106 is described with respect to the representative embodiment of the present invention as using a standard parallel memory interface consisting of independent address signals (A[16:0]), control signals (chip enable signals /CE1, /CE2; write enable signal /WE; output enable signal /OE; and upper and lower bits /UB and /LB respectively) and bidirectional data signals (DQ[15:0]). However, the principles of the present invention could easily be applied to any other memory interface including serial interfaces such as I2C and SPI.

In addition to the standard memory interface, access to the CMOS Register Map 106 is performed by setting the RA pin to a high/1 state and driving the Address Bus, pins A[16:0], to a value that addresses a selected register. The RA pin is essentially an upper order address bit that selects between the user memory (RA=0) and the register map (RA=1). The registers in the CMOS Register Map 106 include a 128-bit Authentication Data Buffer, an Administrator Register, a Control Register, a Lock register, a Fail Counter Register, and a Status Register. These registers may not comprise a portion of the standard F-RAM memory and may be implemented in CMOS, although some of the registers may be backed up as non-volatile configuration settings.

With reference additionally now to Table 1of FIG. 1B, a chart illustrative of a representative organization of the CMOS Register Map 106 of the preceding figure is shown. Before the Host authenticates itself to the F-RAM Authenticating Memory Device 100, it will only have read access to the Status Register and read/write access of the Control Register needed to initiate the authentication process.

The Authentication Data Buffer (Table 1) at addresses 0x00000 to 0x00007 is a 128-bit register that is used to transmit and receive data during the authentication and CSP update procedures. It is only accessible at certain points in the protocol and will be discussed in detail in the next section.

The Administrator Register (Table 1) controls certain administrative functions and is only read/write accessible after the Host has authenticated in the administrator role. The Administrator Register controls the following functions:

[C1,C0]: Controls the number of memory accesses before the current authentication session ends. The values chosen for the Device are arbitrary and could be set to any value.

With reference additionally now to Table 2of FIG. 1C, a chart illustrative of the settings for a representative number of accesses before a current authentication ends is shown.

[T1,T0]: Controls the amount of time before the current authentication session ends. The values chosen for the Device are arbitrary and could be set to any value.

With reference additionally now to Table 3of FIG. 1D, a chart illustrative of the settings for a representative time until a current authentication ends is shown. 25

[UP] Initiates the CSP update procedure for the selected CSP determined by [U3,U2,U1,U0].

[U3,U2,U1,U0]: Selects which CSP will be updated for the CSP update procedure.

With reference additionally now to Table 4of FIG. 1E, a chart illustrative of a representative critical security parameters (CSP) update selection is shown.

[EP]: Flag bit that determines if an erase event was caused by driving the ERS pin high.

[EA]: Flag bit that determines if an erase event was caused by exceeding the maximum number of failed authentication attempts determined by the [MF1,MF0] bits.

[EC] Flag bit that determines if an erase event was caused by the Host sending an erase command. An erase command is issued by setting the [EE] bit in the Control Register.

[MF1,MF0]: Control the maximum number of failed authentication attempts before the Device will initiate an erase event. The values chosen for the Device are arbitrary and could be set to any value.

With reference additionally now to Table 5of FIG. 1F, a chart of representative settings for a maximum number of failed authentication attempts in accordance with the technique of the present invention is shown.

[RF]: Control bit that resets the Fail Counter Register back to 0x0000.

The Control Register (Table 1) has the following capabilities described with respect to the ensuing disclosure and drawing figures. Access to the Control Register is allowed only when the Ready bit in the Status Register is high. The Host does not have to be authenticated to access the Control Register.

[TXACT]: Control bit that indicates when the Host is accessing the Authentication Data Buffer for an authentication or CSP update procedure. Before the Host reads or writes from the Authentication Data Buffer, the Host must set the TXACT bit high. When the Host has completed all reads/writes from/to the Authentication Data Buffer, the Host must then clear the TXACT low to allow the algorithm to continue.

[EB]: Control bit that enables the Built-In Self Test procedure to verify the Cipher Engine is operating properly. The Host must set the EB bit to enable the BIST procedure. The Ready bit in the Status Register will be low while BIST is in progress. When the BIST procedure is complete, The Ready bit will return high and pass/fail status will be indicated by the Err bit in the Status Register.

[ADM]: Control bit that selects if the Host wants to authenticate in the User role (ADM=0) or the Administrator role (ADM=1).

[AE]: Control bit to end the current authentication session.

[EE] Control bit to start an erase event. When completed, the EC bit will be set in the Administrator Register.

The Lock Register (Table 1) can only be accessed after the Host has been authenticated in the Administrator role. Once authenticated, various lock bits can be set and/or cleared to determine which CSPs are eligible to be changed. All used bits in this register are non-volatile configuration bits and are stored in F-RAM.

[ML]: This is the master lock bit. This bit locks the state of the other lock bits so they cannot be altered. Once this bit is set, it can never be cleared unless an erase event occurs, in which case all lock bits are returned to a unlocked/0 state.

[LAK] Lock the Administrator encryption key.

[LUK] Lock the User encryption key.

[LAP]: Lock the Administrator passwords PWD1A, PWD2A, and PWDADM.

[LUP]: Lock the User passwords PWD1U, PWD2U, PWDR, and PWDW

[LI] Lock the Host and Memory Identifiers HostID and MemID.

The Fail Counter Register (Table 1) contains the number of failed authentication attempts since the last time the Fail Counter Register was cleared. The value is stored in binary format and can count up to 65535 failed authentication attempts. This register is stored in nonvolatile F-RAM memory and is read only. It can only be cleared by setting the RF bit in the Administrator Register.

The Status Register (Table 1) contains read-only flag bits that indicate the current status of the Device. the following bits are contained in the Status Register:

[UP Fail]: A CSP update procedure has failed. If this bit is high, then an attempt to update the selected CSP has failed and the original CSP should be used to authenticate or perform another CSP update. This bit is non-volatile and stored in F-RAM configuration in case a power interruption occurs during a CSP update.

[EIP]: Status bit to indicate that an erase event is in progress.

[Err]: Error bit to indicate that BIST of Cipher Engine has failed.

[Fail] Bit that indicates an authentication attempt has failed.

[Ready]: Bit that indicates the Device is ready to receive or transmit data from/to the Authentication Data Buffer during an authentication procedure or CSP update procedure. Use of this bit will be described in detail in the Authentication Procedure and CSP Update Procedure sections which follow.

The type of additional information to which access is granted depends upon the role in which the Host authenticates itself. Authentication of the Host to the Device can be performed in two different roles, a User role and an Administrator role. The user role is used for the Host to gain access to the user F-RAM memory space. The administrator role is used to change the CSPs stored in the CSP and Configuration F-RAM Memory Space.

When the Host authenticates itself using the User role, the Host and Device use a specific set of passwords and encryption keys dedicated for the User authentication only. If the User authentication completes successfully, the Host will be granted read/write access to the F-RAM User Memory space. Depending upon certain User authentication options, the User may be authenticated for read-only User Memory access, write-only User Memory access, or both read and write User Memory access. The User role will not grant access to modifying any CSPs or locking any CSPs.

A failed authentication attempt will result in incrementing the Fail Counter Register. The User authentication algorithm will be described in greater detail hereinafter.

When the Host authenticates itself using the Administrator role, the Host and Device use a specific set of passwords and encryption keys dedicated for the Administrator authentication only. If the Administrator authentication completes successfully, the Host will be granted read/write access to the Administrator Register and Lock Register, read access to the Fail Counter Register, and the ability to update any CSPs that are not locked. The Administrator role will not grant any access to the User Memory.

A failed Administrator authentication attempt will result in incrementing the Fail Counter Register. The Administrator authentication algorithm will also be described in greater detail hereinafter.

Two types of authentication are possible for the device, a User authentication or an Administrator authentication. Each will be described separately hereinafter.

The User authentication algorithm is controlled by the Authentication State Machine 122 and communication is interfaced through the CMOS Register Map 106. The User authentication algorithm can be broken down into four distinct transmissions, namely TX1, TX2, TX3, and TX4. After the TX4 transmission, both the Host and device have enough information to determine if the mutual authentication algorithm has passed or failed.

To successfully complete the User Authentication Algorithm, both the Host and the Device must share CSPs that must be kept secret. This includes the following CSPs:

A unique 64-bit Host Identifier (HostID)
A unique 64-bit Device Identifier (MemID) A 128-bit User encryption key (KeyU)
Two 64-bit User authentication passwords (PWD1U, PWD2U)
One of the following memory access passwords:
  A 64-bit read memory password if read memory access is desired (PWDR)
  A 64-bit write memory password if write memory access is desired (PWDW).

It should be noted that the read and write memory passwords may be programmed to the same value to obtain both read and write memory access simultaneously.

Figure 2:
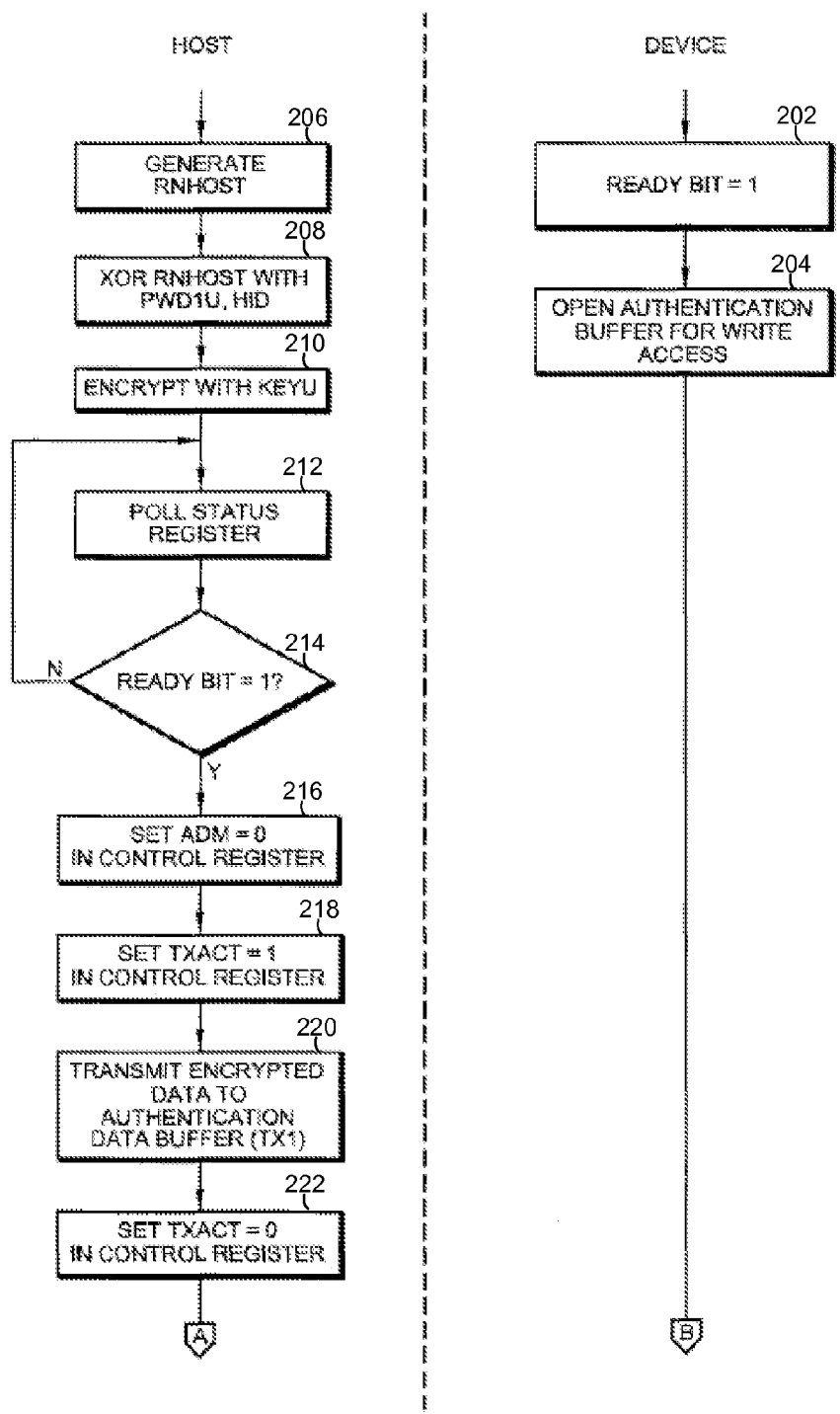
FIG. 2 is a representative flow chart for the TX1, user authentication protocol in accordance with the representative embodiment of the present invention.

With reference additionally now to FIG. 2, a representative flow chart for the TX1, user authentication protocol in accordance with the representative embodiment of the present invention is shown. The User authentication begins with the TX1 transmission.

Device:

The Device starts the User Authentication Procedure by setting the Ready bit high in the status register (202) and then opens the Authentication Data Buffer for write access by the Host (204).

Host:

1. The Host begins by generating a 128-bit random number, RNhost[127:0] (206).

2. The Host then XOR's RNhost[127:0] with the concatenation of {PWD1U[63:0],HostID[63:0] } (208).

3. The Host then encrypts the result above with the KeyU [127:0] encryption key using the standard AES128 algorithm (210).

4. The Host then periodically polls the Device's status register (212) until the Ready bit is set (214).

5. The Host must then clear the ADM bit in the control register to authenticate in the User role (216).

6. The Host must then set the TXACT bit in the Control Register to signal to the Device it will be receiving the TX1 transmission (218).

7. The Host must write the encrypted result from #3 into the 128-bit Authentication Data Buffer (220) such that:
  a. Address 0x00000=E({PWD1U[63:0], HostID[63:0] LKeyU[127:0]) [15:0]
  b. Address 0x00001=E({PWD1U[63:0], HostID[63:0] LKeyU[127:0]) [31:16]
  c. Address 0x00002=E({PWD1U[63:0], HostID[63:0]} LKeyU [127:0])[47:32]
  d. Address 0x00003=E({PWD1U[63:0], HostID[63:0] LKeyU[127:0]) [63:48]
  e. Address 0x00004=E({PWD1U[63:0], HostID[63:0]} LKeyU[127:0]) [79:64]
  f. Address 0x00005=E({PWD1U[63:0], HostID[63:0] LKeyU[127:0]) [95:80]
  g. Address 0x00006=E({PWD1U[63:0], HostID[63:0]} LKeyU[127:0])[111: 96]
  h. Address 0x00007=E({PWD1U[63:0], HostID[63:0] LKeyU[127:0]) [127:112]
This is the TX1 transmission.

8. The Host must then clear the TXACT bit after the data has been written to the Authentication Data Buffer (222).

Figure 3:
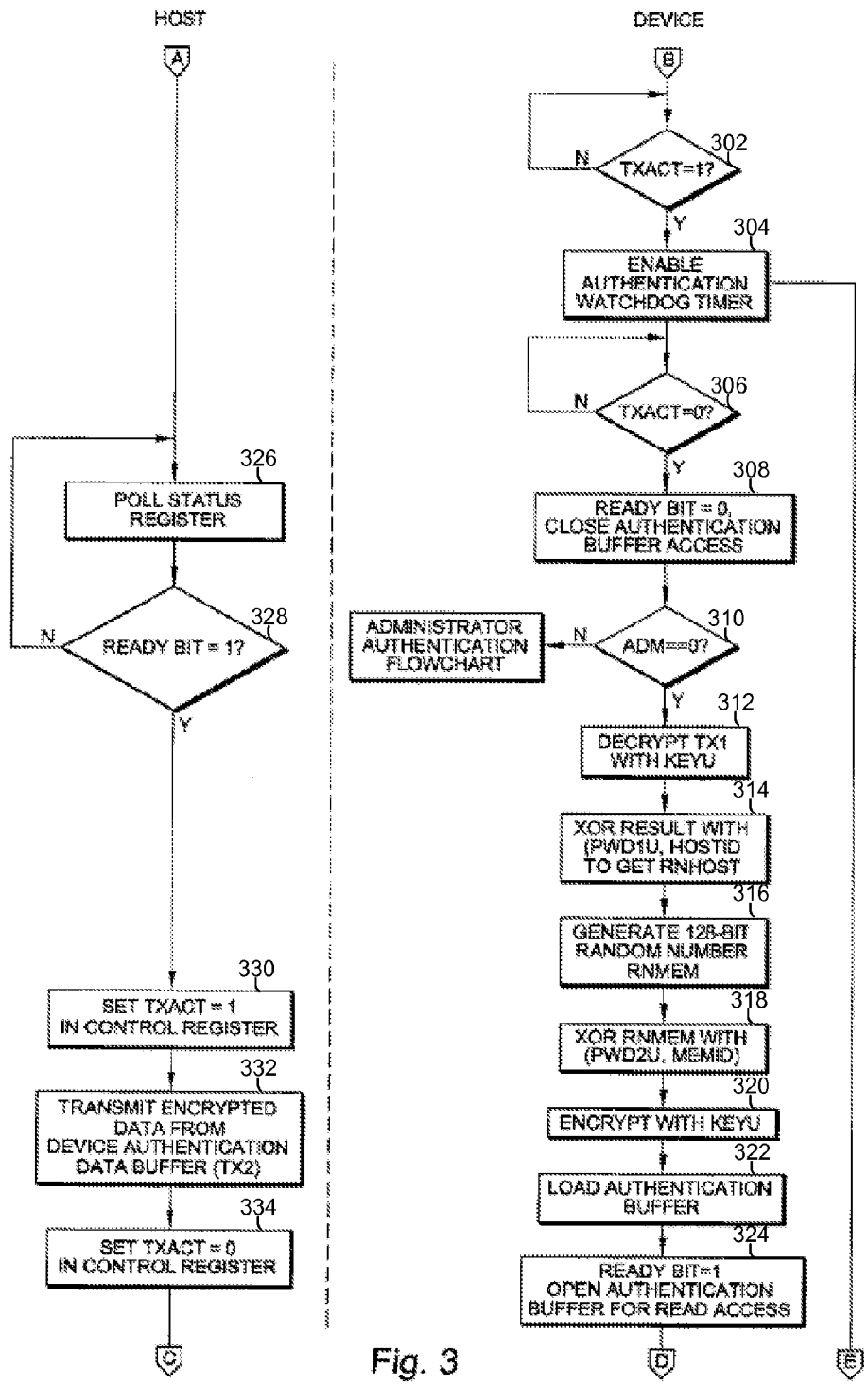
FIG. 3 is a representative flow chart for the TX2, user authentication protocol in accordance with the representative embodiment of the present invention.

With reference additionally now to FIG. 3, a representative flow chart for the TX2, user authentication protocol in accordance with the representative embodiment of the present invention is shown.

Device:

1. The Device waits for the Host to set the TXACT bit high in the TX1 procedure described previously (302). At this time an Authentication Watchdog Timer is started to ensure that the User Authentication Procedure completes in a specified amount of time (304).

2. The Device then waits for the Host to clear the TXACT bit low in the TX1 procedure described previously (306). At this time, the Ready bit in the Status Register is cleared indicating that the device is processing the TX1 data. The Device also closes the Authentication Data Buffer for write access (308).

3. The Device checks the state of the ADM bit in the Control Register (310). If it is low, the Device proceeds with the User Authentication procedure.

4. The Device fetches the KeyU[127:0] value from the F-RAM configuration memory space and decrypts the data stored in the Authentication Data Buffer (312).

5. The Device then fetches the PWD1U[63:0] and HostID [63:0] CSPs from the F-RAM configuration memory space and calculates the XOR of {PWD1U[63:0],HostID[63:0]} with the decrypted result in #4 (314).

a. The result of this operation reveals the RNhost value only if the KeyU, PWD1U and HostID CSPs fetched from F-RAM configuration memory match the CSP values used by the Host.

b. If there is any mismatch in any of the CSPs, the result calculated will not match the RNhost value generated by the Host.

6. The Device then generates its own 128-bit random number, RNmem[127:0], using the THRNG block (316).

7. The Device then fetches the PWD2U[63:0] and MemID [63:0] CSPs from the F-RAM configuration memory space and XOR's RNmem[127:0] with the concatenation of {PWD2U[63:0],MemID[63:0] } (318).

8. The Device then fetches the KeyU[127:0] encryption key from the F-RAM configuration memory space and encrypts the result of #7 using the KeyU encryption key (320).

9. The Device then places the encrypted result of #8 into the Authentication Data Buffer (322) such that:

a. Address 0x00000=E({PWD2U[63:0],MemID[63:0]},KeyU[127:0]) [15:0]

b. Address 0x00001=E({PWD2U[63:0],MemID[63:0] },KeyU[127:0]) [31:16]

c. Address 0x00002=E({PWD2U[63:0],MemID[63:0] },KeyU[127:0]) [47:32]

d. Address 0x00003=E({PWD2U[63:0],MemID[63:0] },KeyU[127:0]) [63:48]

e. Address 0x00004=E({PWD2U[63:0],MemID[63:0] },KeyU[127:0]) [79:64]

f. Address 0x00005=E({PWD2U[63:0],MemID[63:0]},KeyU[127:0]) [95:80]

g. Address 0x00006=E({PWD2U[63:0],MemID[63:0] },KeyU[127:0]) [111:96]

h. Address 0x00007=E({PWD2U[63:0],MemID[63:0]},KeyU[127:0]) [127: 112]

10. The Device then sets the Ready bit to 1 in the Status Register and opens the Authentication Data Buffer for read access (324).

Host:

1. The Host begins by polling the Ready bit in the Status Register (326) until the result is high (328).

2. The Host then sets the TXACT bit in the Control Register high to indicate it will initiate reading the Authentication Data Buffer contents (330).

3. The Host then reads the data stored in the Authentication Data Buffer (332).

4. The Host then clears the TXACT bit in the Control Register low to indicate it has completed reading the Authentication Data Buffer contents (344).

Figure 4:
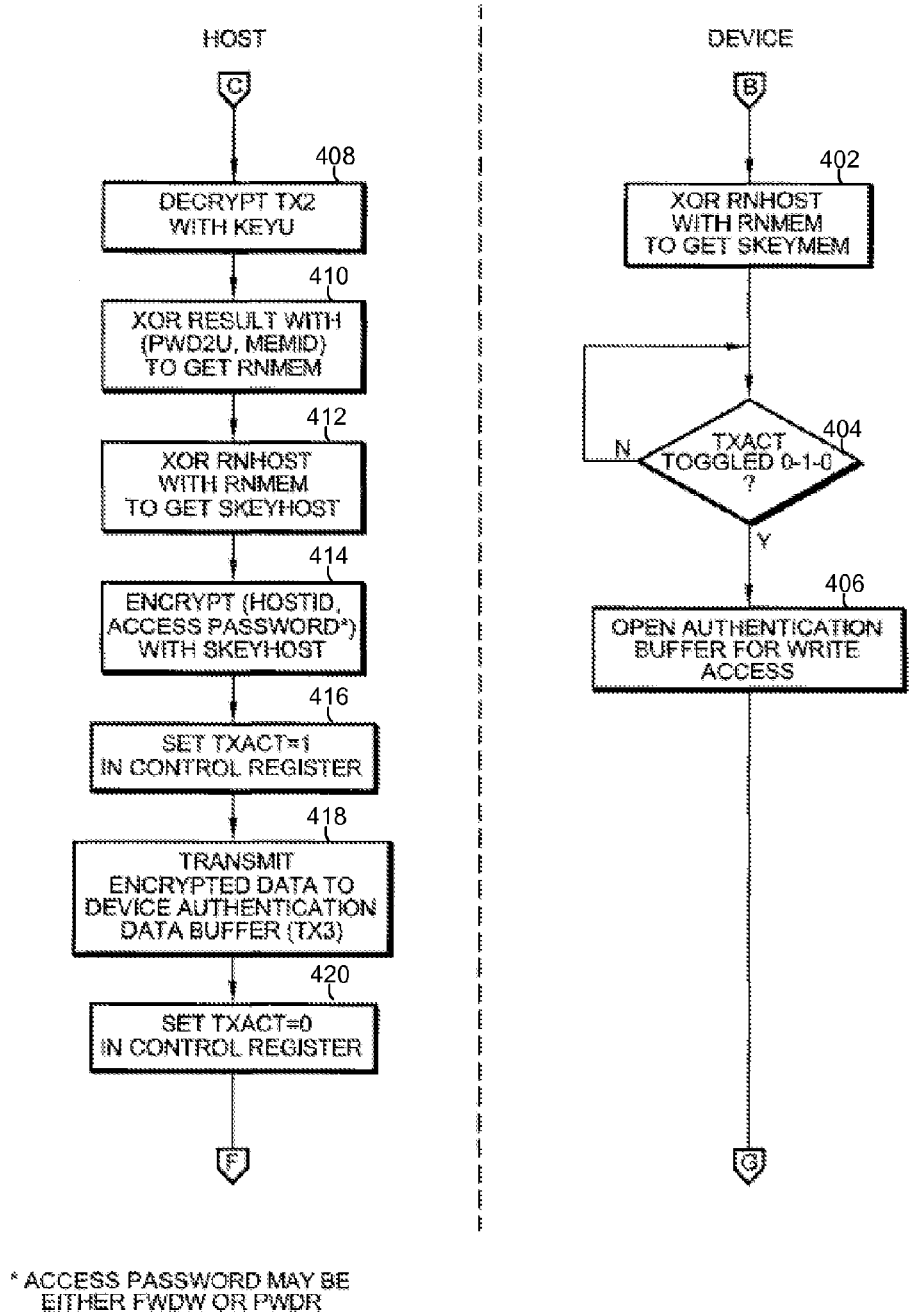
FIG. 4 is a representative flow chart for the TX3, user authentication protocol in accordance with the representative embodiment of the present invention.

With reference additionally now to FIG. 4, a representative flow chart for the TX3, user authentication protocol in accordance with the representative embodiment of the present invention is shown.

Device:

1. The Device XOR's the RNhost[127:0] random number generated by the Host with the RNmem[127:0] random number generated by the Device to generate a 128-bit Session Key, SKEY[127:0] (402).

2. The Device then waits for the TXACT bit in the control register to toggle from low to high, then high to low, indicating that the TX2 transmission has completed (404).

3. The Device then opens the Authentication Data Buffer for write access (406).

Host:

1. The Host begins by decrypting the data from the TX2 transmission using KeyU[127:0] (408).

2. The Host then XOR's the decrypted result with the concatenation of {PWD2U[63:0], MemID[63:0]} to get RNmem[127:0] generated by the Device (410).

a. The result of this operation reveals the RNmem value only if the KeyU, PWD2U and MemID CSPs used by the Device match the CSP values used by the Host.

b. If there is any mismatch in any of the CSPS, the result calculated will not match the RNmem value generated by the Device.

3. The Host XOR's the RNmem[127:0] result from #2 with the RNhost[127:0] it generated for the TX1 transmission to generate the Session Key, SKEY[127:0] (412).

4. The Host then encrypts the concatenation of {HostID [63:0], Access Password[63:0]} using the SKEY[127:0] Session Key it calculated in #3 (414).

a. The Access Password may be PWDR[63:0] if the Host requires User Memory read access/or b. The Access Password may be PWDW[63:0] if the Host requires User Memory write access.

c. The PWDR and PWDW passwords may be set to the same values to allow both User Memory read and write access. This must be done using CSP update algorithm described later in this document.

5. The Host then sets the TXACT bit in the Control Register to a 1 to initiate the TX3 transmission (416).

6. The result of this encryption operation is loaded into the Authentication Data Buffer (418) such that:

a. Address 0x00000=E ({HostID[63:0],PWDR/W[63:0]},SKEYhost[127:0])[15: 0]

b. Address 0x00001=E({HostID[63:0],PWDR/W[63:0]},SKEYhost[127:0])[31:16]

c. Address 0x00002=E({HostID[63:0],PWDR/W[63:0]},SKEYhost[127:0])[47:32]

d. Address 0x00003=E({HostID[63:0],PWDR/W[63:0]},SKEYhost[127:0])[63:48]

e. Address 0x00004=E({HostID[63:0],PWDR/W[63:0]},SKEYhost[127:0])[79:64]

f. Address 0x00005=E({HostID[63:0],PWDR/W[63:0]},SKEYhost[127:0])[95:80]

g. Address 0x00006=E({HostID[63:0],PWDR/W[63:0]},SKEYhost[127:0])[111:96]

h. Address 0x00007=E({HostID[63:0],PWDR/W[63:0]},SKEYhost[127:0])[127:112]

This is the TX3 data transmission.

7. The Host then clears the TXACT bit in the Control Register to a 0 to complete the TX3 transmission (420).

Figure 5:
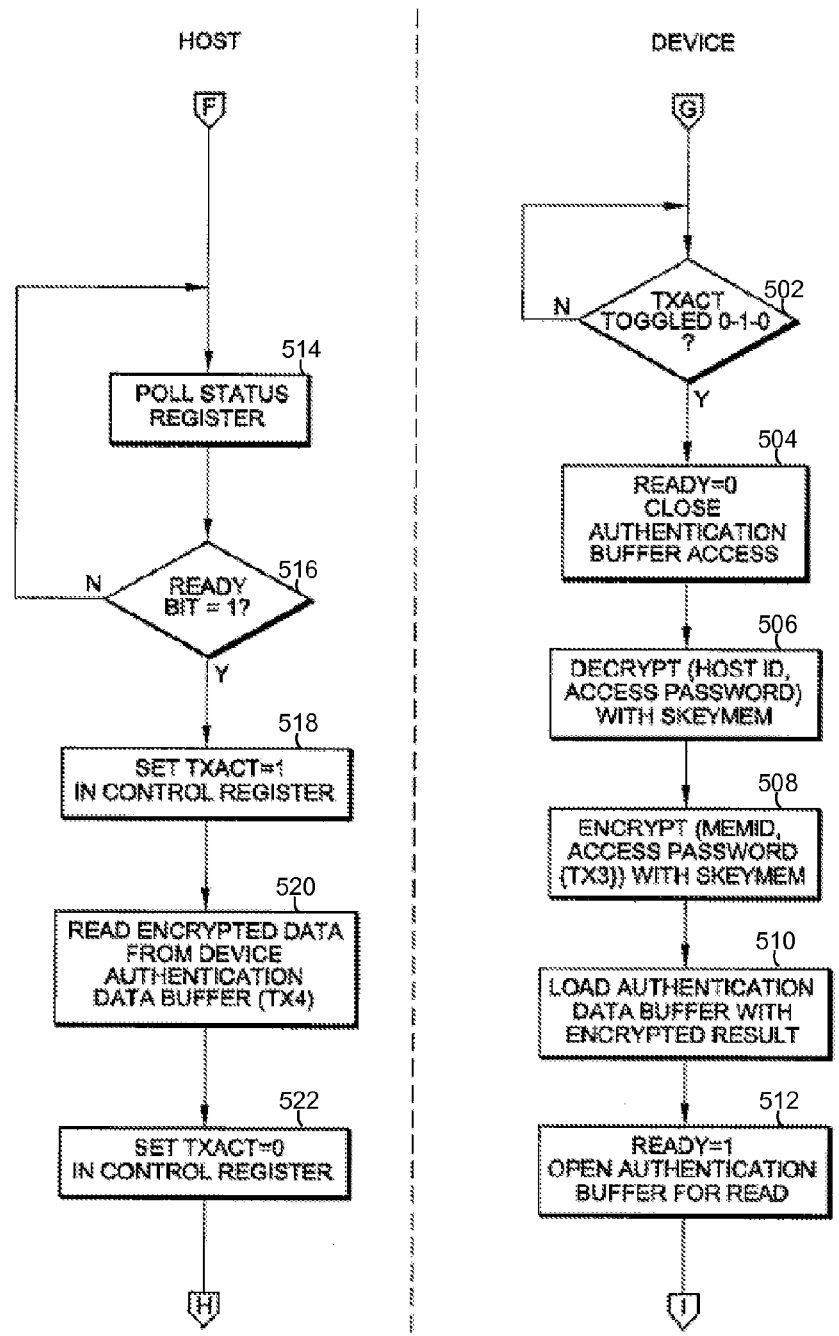
FIG. 5 is a representative flow chart for the TX4, user authentication protocol in accordance with the representative embodiment of the present invention.

With reference additionally now to FIG. 5, a representative flow chart for the TX4, user authentication protocol in accordance with the representative embodiment of the present invention is shown.

Device:

1. The Device waits for the TXACT bit in the control register to toggle from low to high, then high to low, indicating that the TX3 transmission has completed (502).

2. The Device then closes the Authentication Data Buffer for write access (504).

3. The Device then decrypts the TX3 data in the Authentication Data Buffer using its Session Key, SKEYmem [127:0] (506).

4. The Device then fetches the MemID[63:0] CSP from the F-RAM Configuration Memory space and encrypts {MemID [63:0], Access Password[63:0]} using the Session Key, SKEYmem[63:0] (508).

5. The Device loads the Authentication Data Buffer with the encrypted result from #4 (510) using the following format:
   a. Address 0x00000=E({MemID[63:0],PWDR/W[63:0]}, SKEYmem[127:0])[15:0]
   b. Address 0x00001=E({MemID[63:0],PWDR/W[63:0]}, SKEYmem[127:0])[31:16]
   c. Address 0x00002=E({MemID[63:0],PWDR/W[63:0]}, SKEYmem[127:0])[47:32]
   d. Address 0x00003=E({MemID[63:0],PWDR/W[63:0]}, SKEYmem[127:0])[63:48]
   e. Address 0x00004=E({MemID[63:0],PWDR/W[63:0]}, SKEYmem[127:0])[79:64]
   f. Address 0x00005=E({MemID[63:0],PWDR/W[63:0]}, SKEYmem[127:0])[95:80]
   g. Address 0x00006=E({MemID[63:0],PWDR/W[63:0]}, SKEYmem[127:0])[111:96]
   h. Address 0x00007=E({MemID[63:0],PWDR/W[63:0]}, SKEYmem[127:0])[127:112]

6. The Device then sets the Ready bit in the Status Register high. The Device also opens the Authentication Data Buffer for read access (512).

Host:

1. The Host polls the Ready bit in the Status Register (514) until the Ready bit is read as a 1, indicating that the TX4 data is ready for transmission (516).

2. The Host sets the TXACT bit in the Control Register high/indicating the Host is ready to start the TX4 data transmission (518).

3. The Host reads the TX4 data from the Authentication Data Buffer (520).

4. The Host then clears the TXACT bit in the Control Register high, indicating the Host has completed the TX4 data transmission (522).

Figure 6A:
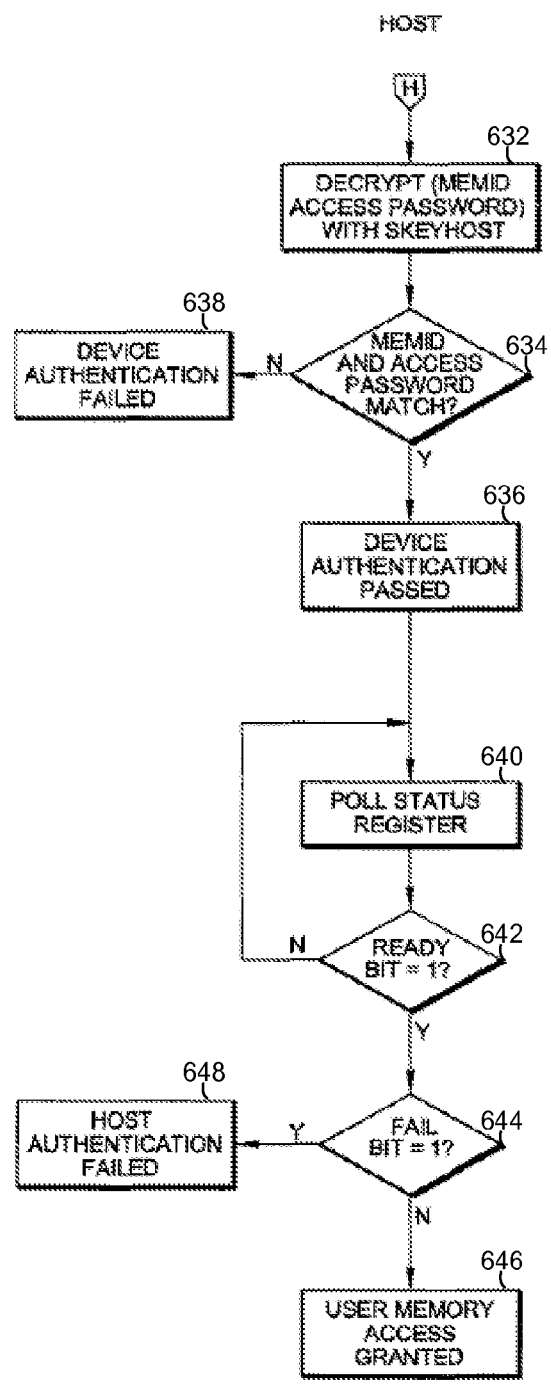
FIG. 6 is a representative flow chart for the user authentication protocol Pass/Fail in accordance with the representative embodiment of the present invention.
Figure 6B:
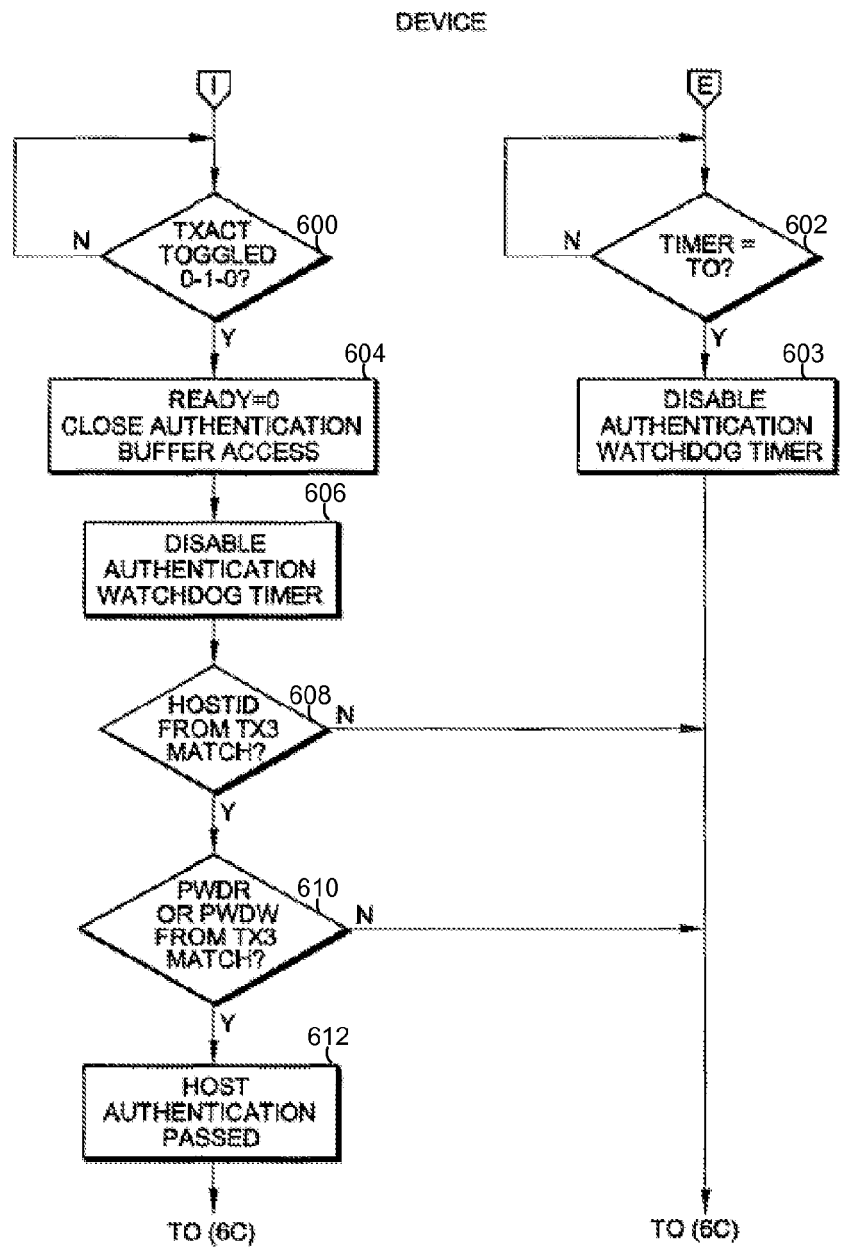
Figure 6C:
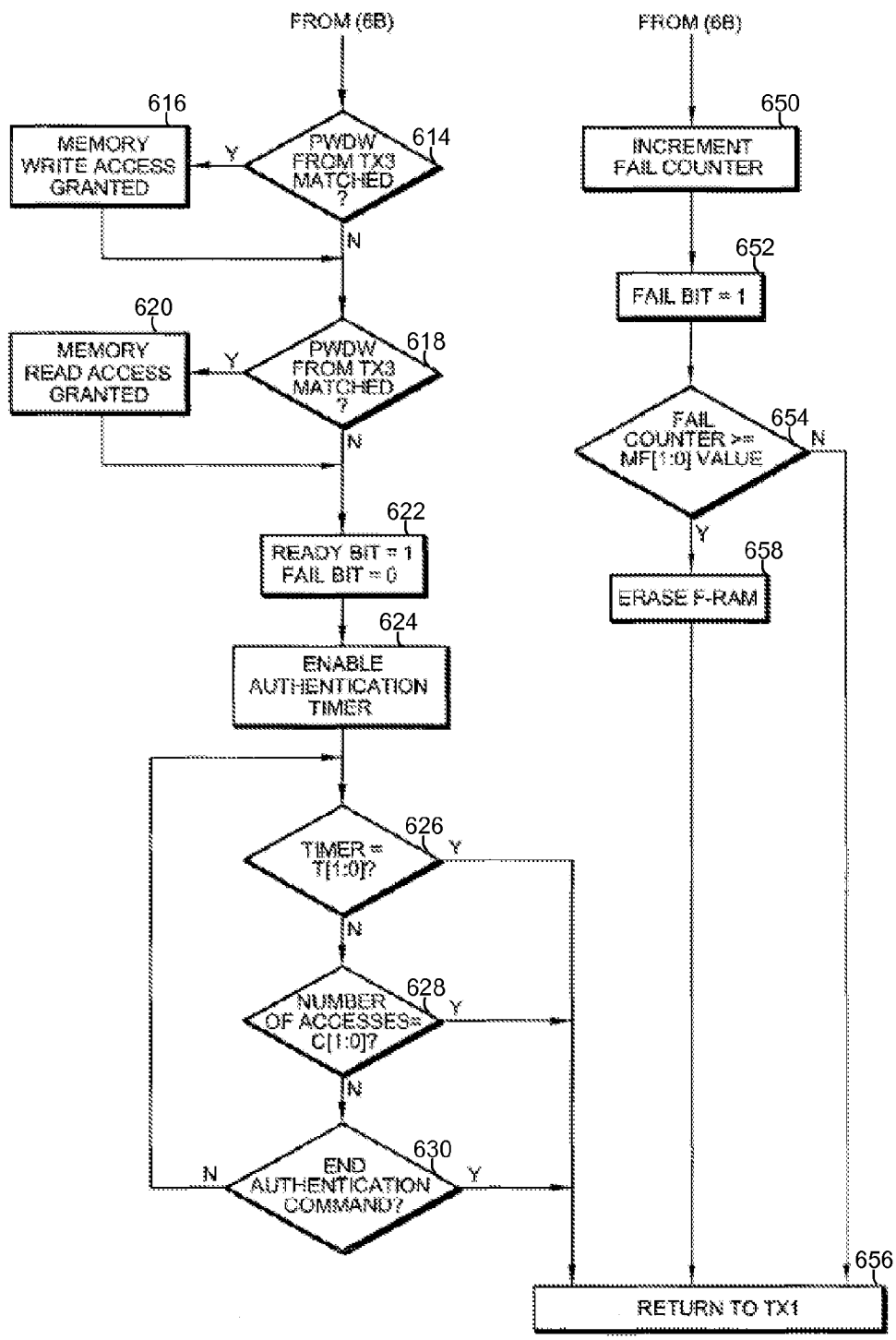

With reference additionally now to FIGS. 6A-6C, a representative flow chart for the user authentication protocol Pass/Fail in accordance with the representative embodiment of the present invention is shown.

Device:

1. The Device waits for the TXACT bit in the control register to toggle from low to high, then high to low, indicating that the TX4 transmission has completed (600) while continually monitoring the Authentication Watchdog Timer (602). If the Authentication Watchdog Timer exceeds the maximum time allowable the Authentication Watchdog Timer is disabled (603), and the Device moves to the Error Handling Procedure.

2. The Device then clears the Ready bit and locks the Authentication Data Buffer for read access (604).

3. The Authentication Watchdog Timer is disabled now that all authentication data transmissions have completed (606).

4. The Device then verifies that the HostID sent by the Host and decrypted from the TX3 transmission using the Session Key SKEYmem matches the value of the HostID stored in the F-RAM Configuration Memory Space (608).

a. If there is a match the Device moves to step 5 below.
   b. If there is not a match, the Device moves to the Error Handling Procedure.

5. The Device then verifies that the Access Password sent by the Host and decrypted from the TX3 transmission using the Session Key SKEYmem matches at least one of the values of the PWDR[63:0] or PWDW[63:0] stored in the F-RAM Configuration Memory Space (610).
   a. If there is a match the Device moves to step 6 below.
   b. If there is not a match, the Device moves to the Error Handling Procedure.

6. If the Device confirms a match between both the HostID and the Access Password, the Host has been successfully authenticated by the Device (612).
   a. If the Access Password matches only PWDR Access Password (614), the Host is granted read only access to the User Memory Space (616).
   b. If the Access Password matches only PWDW Access Password (618), the Host is granted write only access to the User Memory Space (620).
   c. If the Access Password matches both the PWDR and PWDW Access Passwords, the Host is granted read and write access to the User Memory Space.

7. After successful authentication, the Ready bit is high and the fail bit low (622), the authentication timer is enabled (624) and the Device continually monitors for exceeding the Authentication Timeout (626), Maximum number of memory accesses (628) and an end authentication command (630). If any of these conditions become true, the current authentication session ends and the Session Key is cleared.

Host:

1. The Host decrypts the TX4 transmission using the SKEYHost[127:0] Session Key to retrieve the MemID[63:0] and Access Password[63:0] (632).

2. The Host must then compare the decrypted MemID and Access Password with the values sent to the Device in the TX3 transmission (634).
   a. If the MemID and Access Password match the values the Host sent in the TX3 transmission, the Device has been successfully authenticated (636).
   b. If the MemID and Access Password do not match the values the Host sent in the TX3 transmission, the Device has not been successfully authenticated (638). The Host can then take appropriate measures such as attempting to re-authenticate, erase the Device, etc.

3. The Host must then poll the Status Register Ready bit to wait for the Device's authentication of the Host to complete (640). The Device is ready when the Ready bit is high (642).

4. The Host must then check the state of the Status Register Fail to determine if the Device authentication of the Host completed successfully (644).
   a. If the Fail bit is low/0, Device authentication of the Host completed successfully and memory access is granted based upon the Access Password the Host sent in the TX3 transmission (646).
   b. If the Fail bit is high/1, Device authentication of the Host has failed and no memory access is granted (648).

Device:

1. The device will enter the Error Handling Procedure if any of the following occur:
   a. The Device determines that HostID sent by the Host and decrypted from the TX3 transmission using the Session Key SKEYmem does not match the value of the HostID stored in the F-RAM Configuration Memory Space (608 in FIG. 6B).
   b. The Device determines that Access Password sent by the Host and decrypted from the TX3 transmission using the Session Key SKEYmem does not match the value of at least one of the PWDW or PWDR Access Passwords stored in the F-RAM Configuration Memory Space (610 in FIG. 6B).

c. The Authentication Watchdog Timer exceeds the maximum time allowable to complete the User Authentication Procedure (602 in FIG. 6B).

2. The Device then increments the Authentication Fail Counter value (650).

3. The Device then sets the Authentication Fail Bit in the Status Register (652).

4. The Device then checks to see if Authentication Fail Counter exceeds the value determined by the value stored in the Administrator Register's MF [1:0] bits (654).

a. If the value is not exceeded, the Device returns to the start of the TX1 procedure and will wait for a new authentication procedure to begin (656).

b. If the value is exceeded, the Device will enter the Erase Procedure to erase the User Memory and Configuration Memory spaces (658).

The Administrator authentication algorithm is controlled by the Authentication State Machine 122 and communication is interfaced through the CMOS Register Map 106. The Administrator authentication algorithm can be broken down into four distinct transmissions, namely TX1, TX2, TX3, and TX4. After the TX4 transmission, both the Host and device have enough information to determine if the mutual authentication algorithm has passed or failed.

To successfully complete the Administrator Authentication Algorithm, both the Host and the Device must share CSPs that must be kept secret. This includes the following CSPs:

A unique 64-bit Host Identifier (HostID)
A unique 64-bit Device Identifier (MemID)
A 128-bit Administrator encryption key (KeyA)
Two 64-bit Administrator authentication passwords (PWD1A, PWD2A)
A unique 64-bit Administrator Access password (PWDADM)

The Administrator authentication begins with the TX1 transmission.

Figure 7:
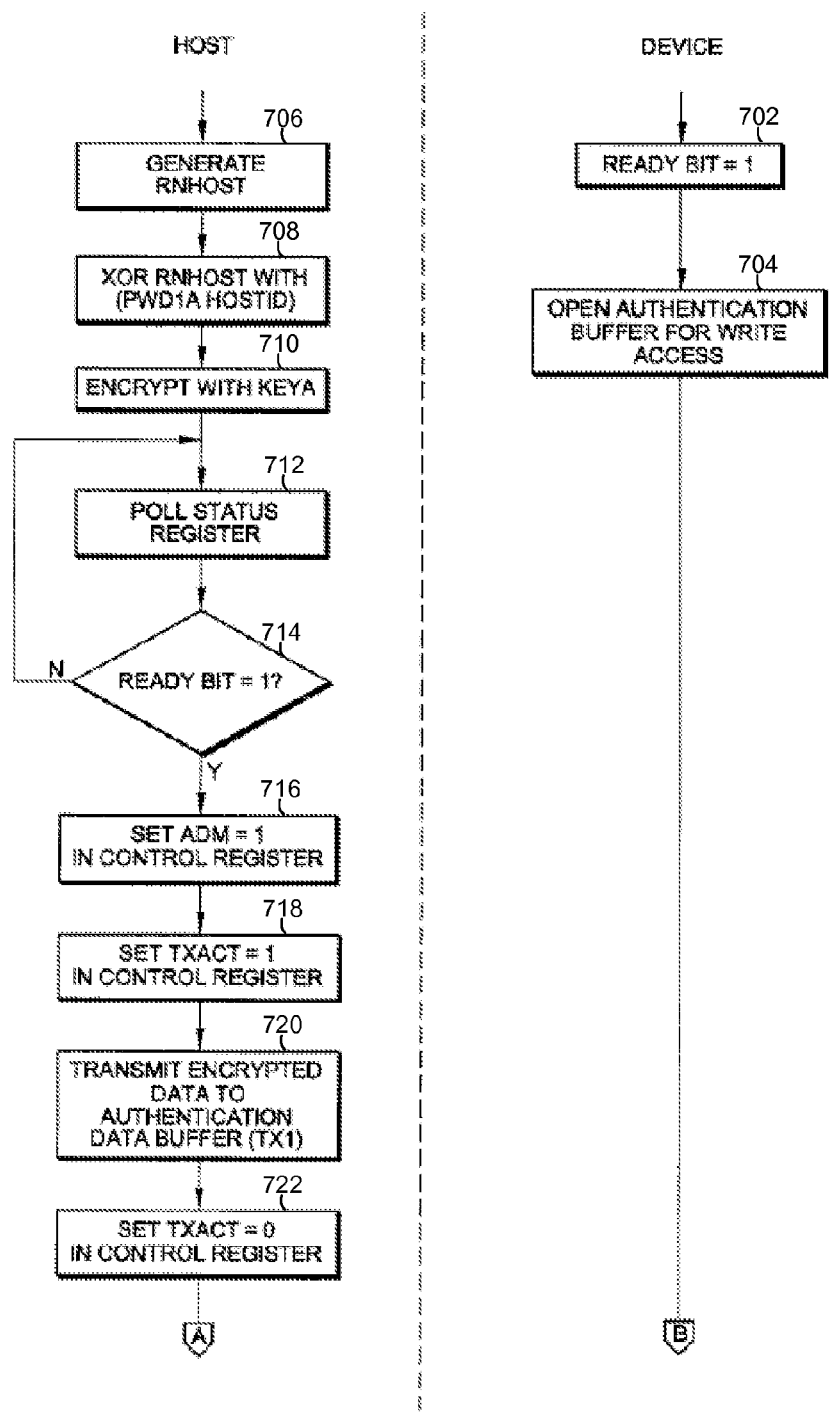
FIG. 7 is a representative flow chart for the TX1 administrator authentication protocol in accordance with the representative embodiment of the present invention.

With reference additionally now to FIG. 7, a representative flow chart for the TX1 administrator authentication protocol in accordance with the representative embodiment of the present invention is shown.

Device:

The Device starts the Administrator Authentication Procedure by setting the Ready bit high in the status register (702) and then opens the Authentication Data Buffer for write access by the Host (704).

Host:

1. The Host begins by generating a 128-bit random number, RNhost[127:0] (706).

2. The Host then XOR's RNhost[127:0] with the concatenation of {PWD1A[63:0],HostID[63:0]} (708).

3. The Host then encrypts the result above with the KeyA [127:0] encryption key using the standard AES128 algorithm (710).

4. The Host then periodically polls the Device's status register (712) until the Ready bit is set (714).

5. The Host must then set the ADM bit in the control register to authenticate in the Administrator role (716).

6. The Host must then set the TXACT bit in the Control Register to signal to the Device it will be receiving the TX1 transmission (718).

7. The Host must write the encrypted result from #3 into the 128-bit Authentication Data Buffer (720) such that:

a. Address 0x00000=E({PWD1A[63:0],HostID[63:0]}, KeyA[127:0])[15:0]

b. Address 0x00001=E({PWD1A[63:0],HostID[63:0]}, KeyA[127:0])[31:16]

c. Address 0x00002=E({PWD1A[63:0],HostID[63:0]}, KeyA[127:0])[47:32]

d. Address 0x00003=E({PWD1A[63:0],HostID[63:0]}, KeyA[127:0])[63:48]

e. Address 0x00004=E({PWD1A[63:0],HostID[63:0]}, KeyA[127:0])[79:64]

f. Address 0x00005=E({PWD1A[63:0],HostID[63:0]}, KeyA[127:0])[95:80]

g. Address 0x00006=E({PWD1A[63:0],HostID[63:0]}, KeyA[127:0])[111:96]

h. Address 0x00007=E({PWD1A[63:0],HostID[63:0]}, KeyA[127:0])[127:112]

This is the TX1 transmission.

8. The Host must then clear the TXACT bit after the data has been written to the Authentication Data Buffer (722).

Figure 8:
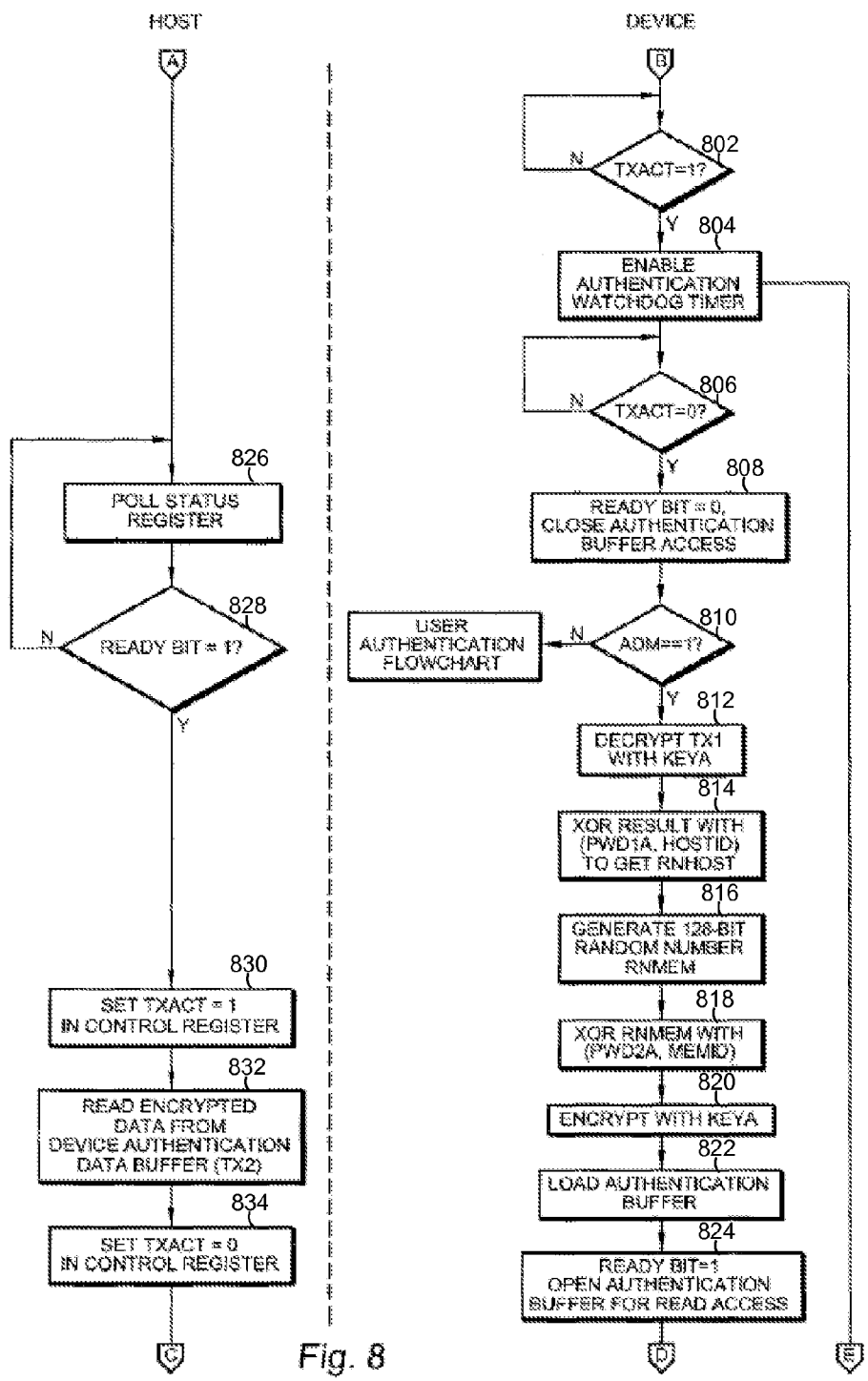
FIG. 8 is a representative flow chart for the TX2 administrator authentication protocol in accordance with the representative embodiment of the present invention.

With reference additionally now to FIG. 8, a representative flow chart for the TX2 administrator authentication protocol in accordance with the representative embodiment of the present invention is shown.

Device:

1. The Device waits for the Host to set the TXACT bit high (802) in the TX1 procedure described previously. At this time an Authentication Watchdog Timer is started to ensure that the Administrator Authentication Procedure completes in a specified amount of time (804).

2. The Device then waits for the Host to clear the TXACT bit low (806) in the TX1 procedure described previously. At this time, the Ready bit in the Status Register is cleared indicating that the device is processing the TX1 data. The Device also closes the Authentication Data Buffer for write access (808).

3. The Device checks the state of the ADM bit in the Control Register (810). If it is high, the Device proceeds with the Administrator Authentication procedure.

4. The Device fetches the KeyA[127:0] value from the F-RAM configuration memory space and decrypts the data stored in the Authentication Data Buffer (812).

5. The Device then fetches the PWD1A[63:0] and HostID [63:0] CSPs from the F-RAM configuration memory space and calculates the XOR of {PWD1A[63:0],HostID[63:0]} with the decrypted result in #4 (814).

a. The result of this operation reveals the RNhost value only if the KeyA, PWD1A and HostID CSPs fetched from F-RAM configuration memory match the CSP values used by the Host.

b. If there is any mismatch in any of the CSPs, the result calculated will not match the RNhost value generated by the Host.

6. The Device then generates its own 128-bit random number/RNmem[127:0], using the THRNG block (816).

7. The Device then fetches the PWD2A[63:0] and MemID [63:0] CSPs from the F-RAM configuration memory space and XOR's RNmem[127:0] with the concatenation of {PWD2A[63:0], MemID[63:0]} (818).

8. The Device then fetches the KeyA[127:0] encryption key from the F-RAM configuration memory space and encrypts the result of #7 using the KeyA encryption key (820).

9. The Device then places the encrypted result of #8 into the Authentication Data Buffer (822) such that:

a. Address 0x00000=E({PWD2A[63:0]1MemID[63:0]} 1KeyA[127:0])[15:0]

b. Address 0x00001=E({PWD2A[63:0]1MemID[63:0]} 1KeyA[127:0])[31:16]

c. Address 0x00002=E({PWD2A[63:0]1MemID[63:0]}1KeyA[127:0])[47:32]

d. Address 0x00003=E({PWD2A[63:0]1MemID[63:0]}1KeyA[127:0])[63:48]

e. Address 0x00004=E({PWD2A[63:0]1MemID[63:0]}1KeyA[127:0])[79:64]

f. Address 0x00005=E({PWD2A[63:0],MemID[63:0]},KeyA[127:0])[95:80]

g. Address 0x00006=E({PWD2A[63:0],MemID[63:0]},KeyA[127:0])[111:96]

h. Address 0x00007=E({PWD2A[63:0], MemID[63:0] },KeyA[127:0]) [127:112]

10. The Device then sets the Ready bit to 1 in the Status Register and opens the Authentication Data Buffer for read access (824).

Host:

1. The Host begins by polling the Ready bit in the Status Register (826) until the result is high (828).

2. The Host then sets the TXACT bit in the Control Register high to indicate it will initiate reading the Authentication Data Buffer contents (830).

3. The Host then reads the data stored in the Authentication Data Buffer (832).

4. The Host then clears the TXACT bit in the Control Register low to indicate it has completed reading the Authentication Data Buffer contents (834).

Figure 9:
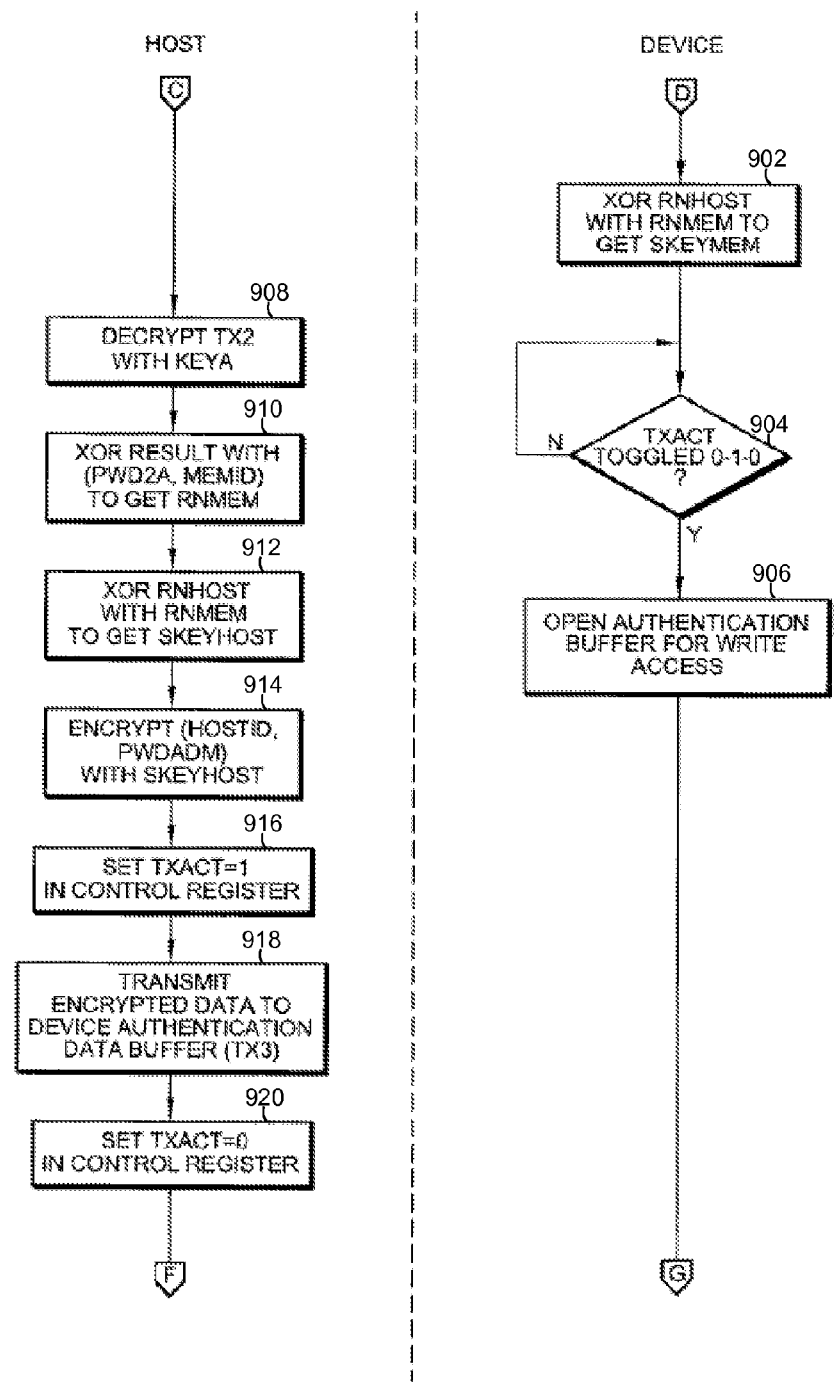
FIG. 9 is a representative flow chart for the TX3 administrator authentication protocol in accordance with the representative embodiment of the present invention.

With reference additionally now to FIG. 9, a representative flow chart for the TX3 administrator authentication protocol in accordance with the representative embodiment of the present invention is shown.

Device:

1. The Device XOR's the RNhost[127:0] random number generated by the Host with the RNmem[127:0] random number generated by the Device to generate a 128-bit Session Key, SKEYmem[127:0] (902).

2. The Device then waits for the TXACT bit in the control register to toggle from low to high, then high to low, indicating that the TX2 transmission has completed (904).

3. The Device then opens the Authentication Data Buffer for write access (906).

Host:

1. The Host begins by decrypting the data from the TX2 transmission using KeyA[127:0] (908).

2. The Host then XOR's the decrypted result with the concatenation of {PWD2A[63:0],MemID[63:0]} to get RNmem[127:0] generated by the Device (910).

a. The result of this operation reveals the RNmem value only if the KeyA, PWD2A and MemID CSPs used by the Device match the CSP values used by the Host.

b. If there is any mismatch in any of the CSPs, the result calculated will not match the RNmem value generated by the Device.

3. The Host XOR's the RNmem[127:0] result from #2 with the RNhost[127:0] it generated for the TX1 transmission to generate the Session Key, SKEYhost[127:0] (912).

4. The Host then encrypts the concatenation of {HostID[63:0],PWDADM[63:0]} using the SKEYhost[127:0] Session Key it calculated in #3 (914).

5. The Host then sets the TXACT bit in the Control Register to a 1 to initiate the TX3 transmission (916).

6. The result of this encryption operation is loaded into the Authentication Data Buffer (918) such that:

a. Address 0x00000=E({HostID[63:0],PWDADM[63:0]}, SKEYhost[127:0])[15:0]

b. Address 0x00001=E({HostID[63:0],PWDADM[63:0]}, SKEYhost[127:0])[31:16]

c. Address 0x00002=E({HostID[63:0],PWDADM[63:0]}, SKEYhost[127:0])[47:32]

d. Address 0x00003=E({HostID[63:0],PWDADM[63:0]}, SKEYhost[127:0])[63:48]

e. Address 0x00004=E({HostID[63:0],PWDADM [63:0]}, SKEYhost[127:0])[79:64]

f. Address 0x00005=E({HostID[63:0],PWDADM[63:0]}, SKEYhost[127:0])[95:80]

g. Address 0x00006=E({HostID[63:0],PWDADM[63:0]}, SKEYhost[127:0])[111:96]

h. Address 0x00007=E({HostID[63:0],PWDADM[63:0]}, SKEYhost[127:0])[127:112]

This is the TX3 data transmission.

7. The Host then clears the TXACT bit in the Control Register to a 0 to complete the TX3 transmission (920).

Figure 10:
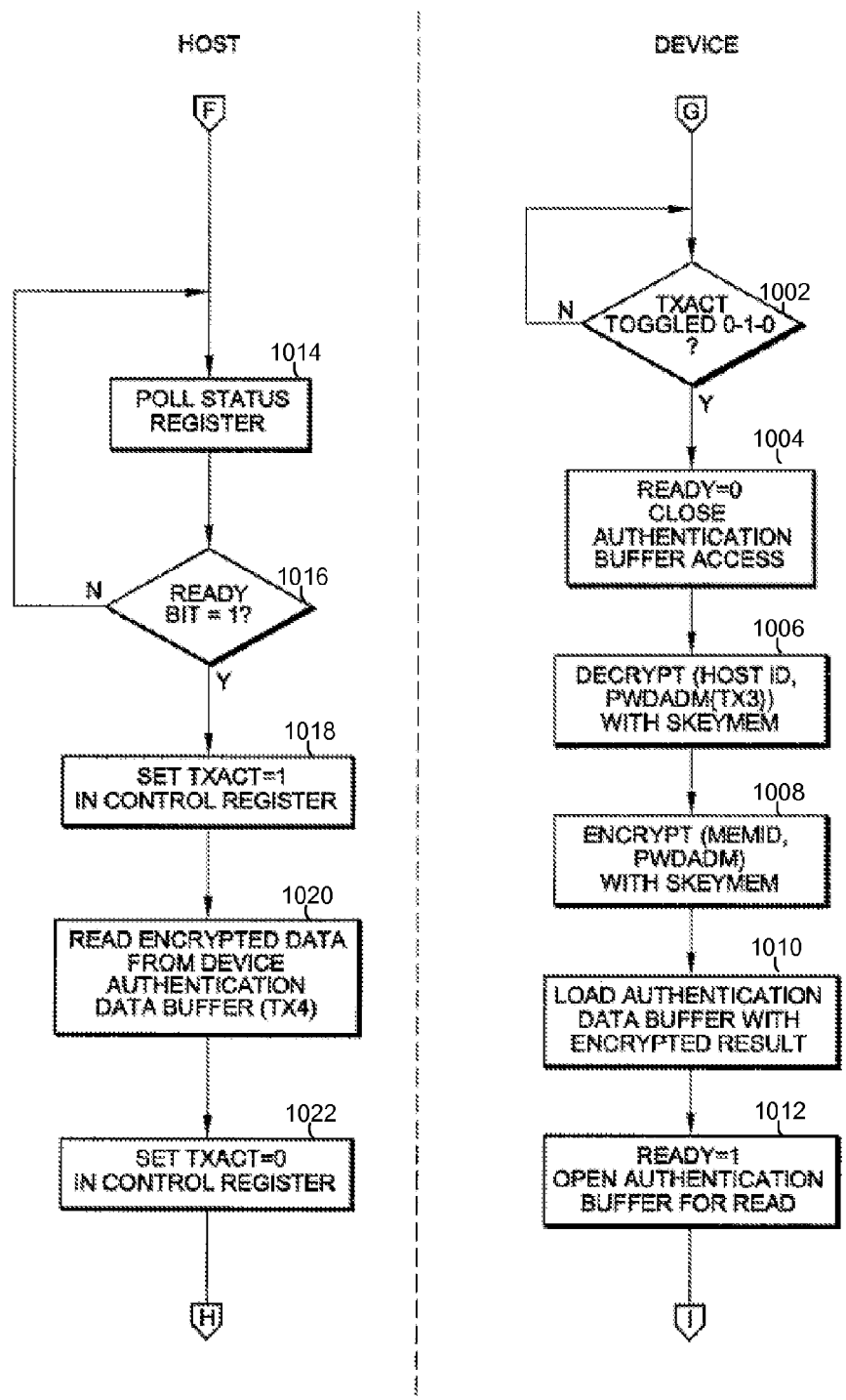
FIG. 10 is a representative flow chart for the TX4 administrator authentication protocol in accordance with the representative embodiment of the present invention.

With reference additionally now to FIG. 10, a representative flow chart for the TX4 administrator authentication protocol in accordance with the representative embodiment of the present invention is shown.

Device:

1. The Device waits for the TXACT bit in the control register to toggle from low to high, then high to low, indicating that the TX3 transmission has completed (1002).

2. The Device then closes the Authentication Data Buffer for write access (1004).

3. The Device then decrypts the TX3 data in the Authentication Data Buffer using its Session Key, SKEYmem [127:0] (1006).

4. The Device then fetches the MemID[63:0] CSP from the F-RAM Configuration Memory space and encrypts {MemID [63:0],PWDADM[63:0]} using the Session Key, SKEYmem [63:0] (1008).

5. The Device loads the Authentication Data Buffer with the encrypted result from #4 (1010) using the following format:

a. Address 0x00000=E({MemID[63:0], PWDADM[63:0]}, SKEYmem[127:0]) [15:0]

b. Address 0x00001=E({MemID[63:0], PWDADM[63:0] }, SKEYmem[127:0]) [31:16]

c. ID [63: 0], PWDADM [63: 0]}, SKEYmem [127:0]) [47:32]

d. Address 0x00003=E({MemID[63:0], PWDADM[63:0]}, SKEYmem[127:0])[63:48]

e. Address 0x00004=E({MemID[63:0], PWDADM[63:0]}, SKEYmem[127:0])[79:64]

f. Address 0x00005=E({MemID[63:0], PWDADM[63:0]}, SKEYmem[127:0])[95:80]

g. Address 0x00006=E({MemID[63:0], PWDADM[63:0]}, SKEYmem[127:0])[111:96]

h. Address 0x00007=E({MemID[63:0], PWDADM[63:0]}, SKEYmem[127:0])[127:112]

6. The Device then sets the Ready bit in the Status Register high. The Device also opens the Authentication Data Buffer for read access (1012).

Host:

1. The Host polls the Ready bit in the Status Register (1014) until the Ready bit is read as a 1, indicating that the TX4 data is ready for transmission (1016).

2. The Host sets the TXACT bit in the Control 15 Register high, indicating the Host is ready to start the TX4 data transmission (1018).

3. The Host reads the TX4 data from the Authentication Data Buffer (1020).

4. The Host then clears the TXACT bit in the Control Register high, indicating the Host has completed the TX4 data transmission (1022).

Figure 11A:
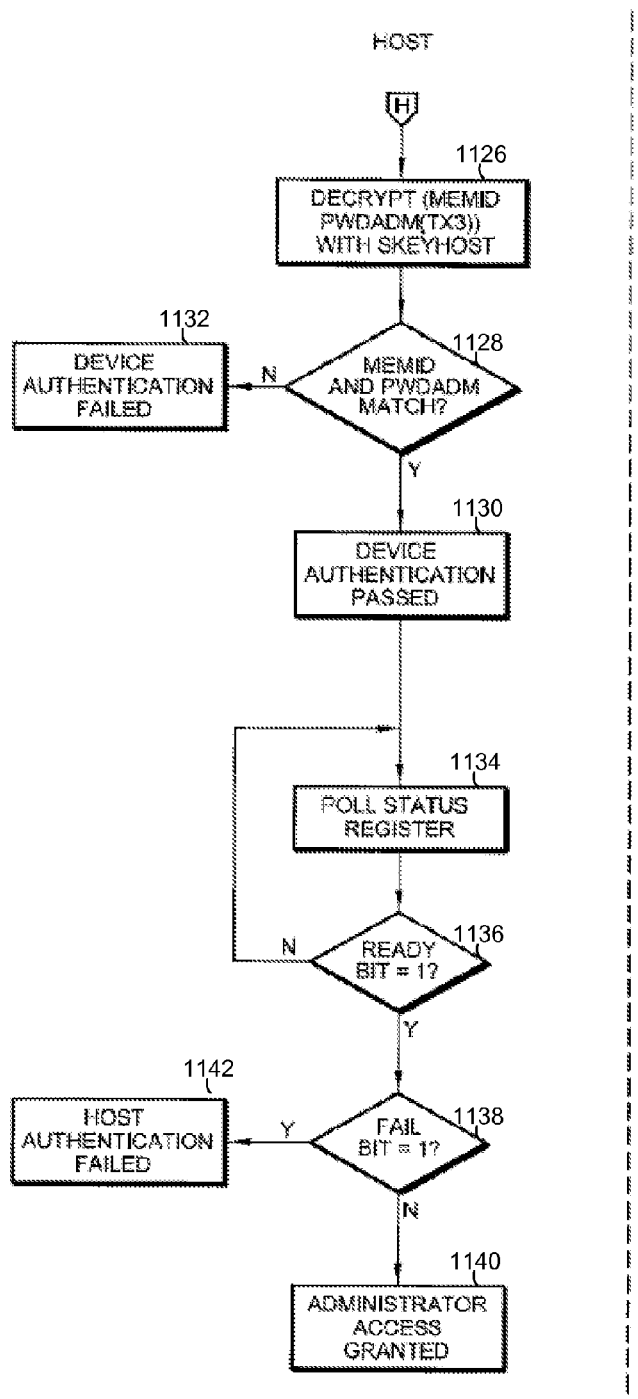
FIG. 11 is a representative flow chart for the administrator authentication protocol Pass/Fail and error handling in accordance with the representative embodiment of the present invention.
Figure 11B:
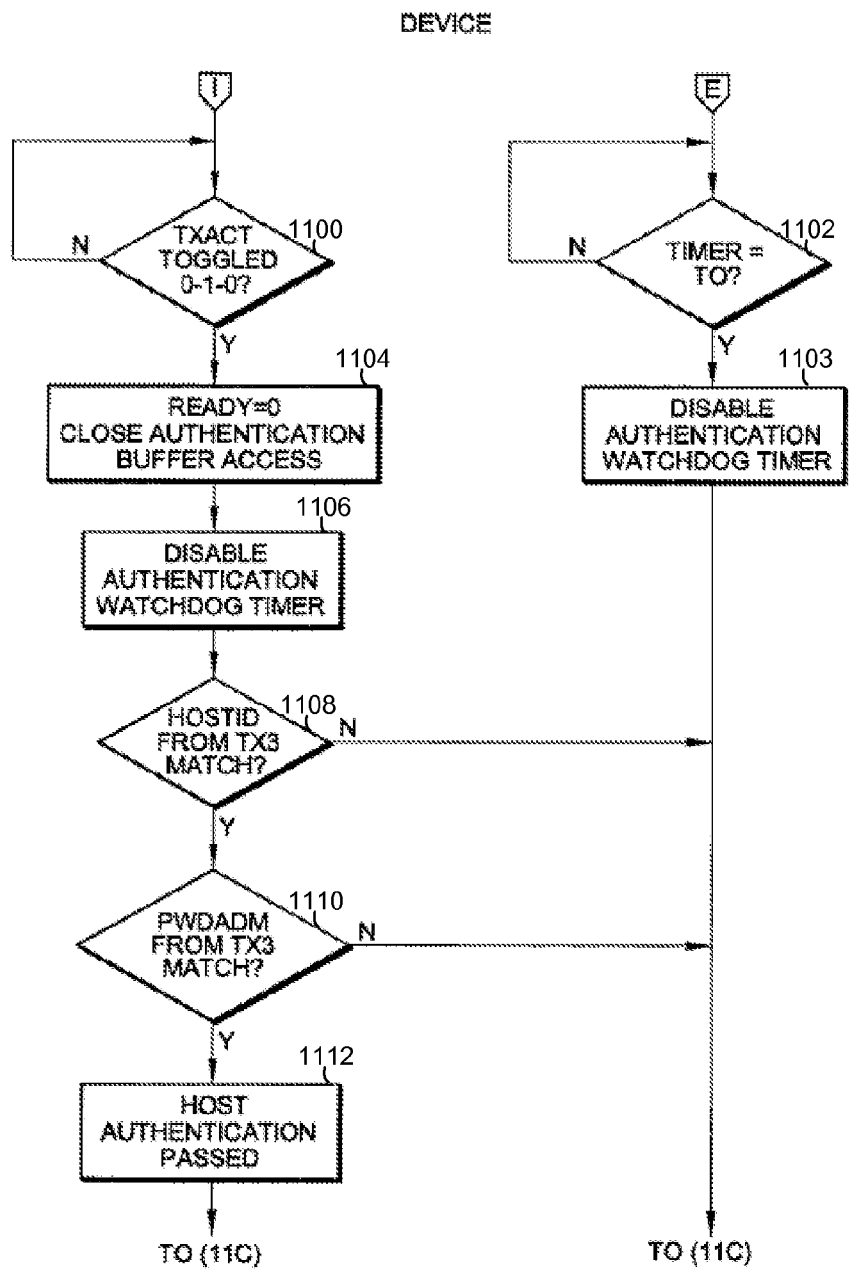
Figure 11C:
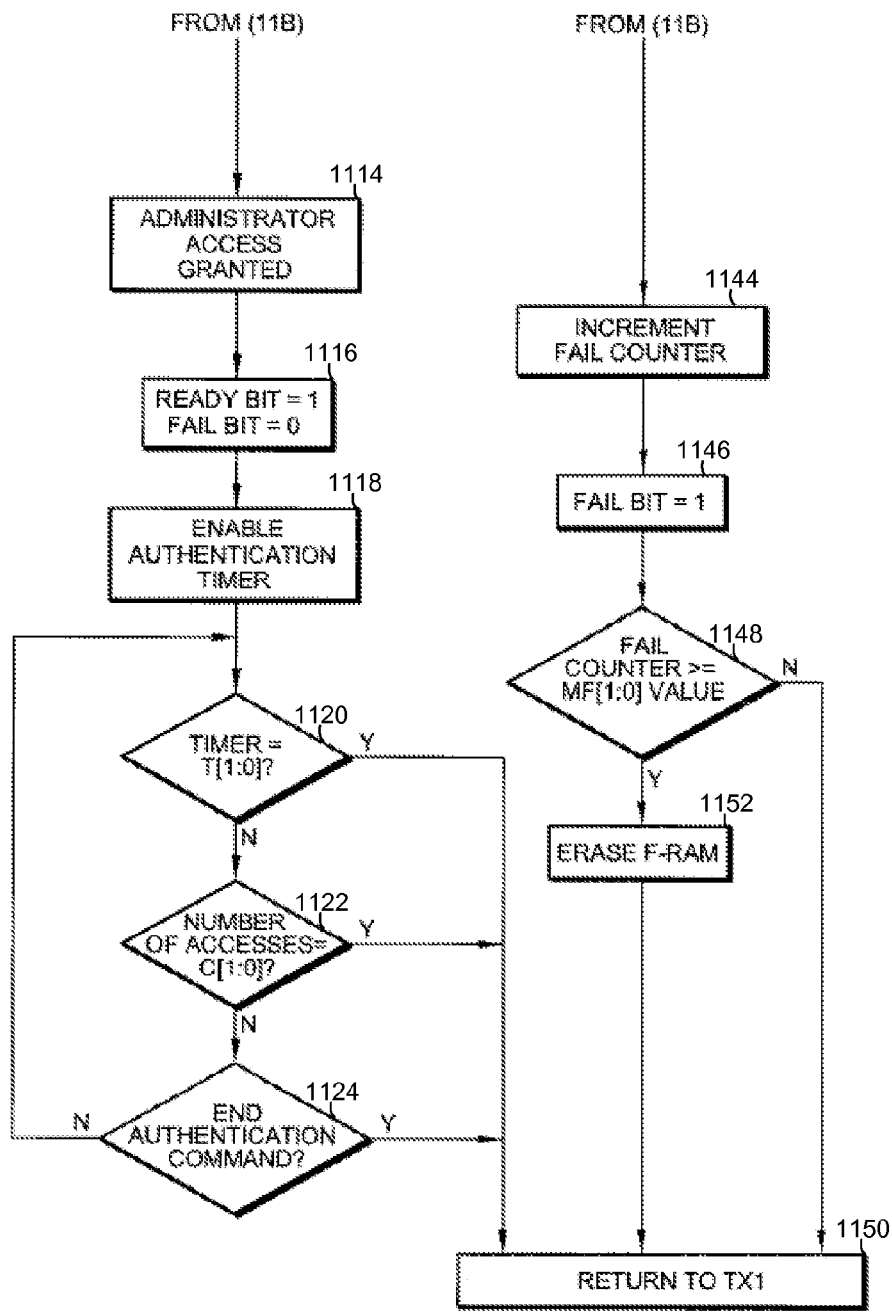

With reference additionally now to FIGS. 11A-C, a representative flow chart for the administrator authentication protocol Pass/Fail and error handling in accordance with the representative embodiment of the present invention is shown.

Device:

1. The Device waits for the TXACT bit in the control register to toggle from low to high, then high to low, indicating that the TX4 transmission has completed (1100) while continually monitoring the Authentication Watchdog Timer (1102). If the Authentication Watchdog Timer exceeds the maximum time allowable the Authentication Watchdog Timer is disabled (1103), and the Device moves to the Error Handling Procedure.

2. The Device then clears the Ready bit and locks the Authentication Data Buffer for read access (1104).

3. The Authentication Watchdog Timer is disabled now that all authentication data transmissions have completed (1106).

4. The Device then verifies that the HostID sent by the Host and decrypted from the TX3 transmission using the Session Key, SKEYmem, matches the value of the HostID stored in the F-RAM Configuration Memory Space (1108).
 a. If there is a match the Device moves to step 5 below.
 b. If there is not a match, the Device moves to the Error Handling Procedure.

5. The Device then verifies that PWDADM sent by the Host and decrypted from the TX3 transmission using the Session Key, SKEYmem, matches PWDADM[63:0] stored in the F-RAM Configuration Memory Space (1110).
 a. If there is a match the Device moves to step 6 below.
 b. If there is not a match, the Device moves to the Error Handling Procedure.

6. If the Device confirms a match between both the HostID and PWDADM, the Host has been successfully authenticated by the Device (1112).

7. After successful authentication, Administrator Access is Granted (1114), the Ready bit is high and the fail bit low (1116), the authentication timer is enabled (1118) and The Device continually monitors for exceeding the Authentication Timeout (1120), Maximum number of Device accesses (1122) and an end authentication command (1124). If any of these conditions become true, the current authentication session ends and the Session Key is cleared.

Host:

1. The Host decrypts the TX4 transmission using the SKEYHost[127:0] Session Key to retrieve the MemID[63:0] and PWDADM[63:0] (1126).

2. The Host must then compare the decrypted MemID and PWDADM with the values sent to the Device in the TX3 transmission (1128).
 a. If the MemID and PWDADM match the values the Host sent in the TX3 transmission, the Device has been successfully authenticated (1130).
 b. If the MemID and PWDADM do not match the values the Host sent in the TX3 transmission, the Device has not been successfully authenticated (1132). The Host can then take appropriate measures such as attempting to re-authenticate, erase the Device, etc.

3. The Host must then poll the Status Register Ready bit to wait for the Device's authentication of the Host to complete (1134). The Device is ready when the Ready bit is high (1136).

4. The Host must then check the state of the Status Register Fail to determine if the Device authentication of the Host completed successfully (1138).
 a. If the Fail bit is low/0, Device authentication of the Host completed successfully and Administrator access is granted (1140).
 b. If the Fail bit is high/1, Device authentication of the Host has failed and no Administrator access is granted (1142).

Device:

1. The device will enter the Error Handling Procedure if any of the following occur:
 a. The Device determines that HostID sent by the Host and decrypted from the TX3 transmission using the Session Key/SKEYmem, does not match the value of the HostID stored in the F-RAM Configuration Memory Space (1108 in FIG. 11B).
 b. The Device determines that PWDADM sent by the Host and decrypted from the TX3 transmission using the Session Key, SKEYmem, does not match the value of PWDADM stored in the F-RAM Configuration Memory Space (1110 in FIG. 11B).
 c. The Authentication Watchdog Timer exceeds the maximum time allowable to complete the Administrator Authentication Procedure (1102 in FIG. 11B).

2. The Device then increments the Authentication Fail Counter value (1144).

3. The Device then sets the Authentication Fail Bit in the Status Register (1146).

4. The Device then checks to see if the Authentication Fail Counter exceeds the value determined by the value stored in the Administrator Register's MF[1:0] bits (1148).
 a. If the value is not exceeded, the Device returns to the start of the TX1 procedure and will wait for a new authentication procedure to begin (1150).
 b. If the value is exceeded, the Device will enter the Erase Procedure to erase the User Memory and Configuration Memory spaces (1152).

The CSP update algorithm is used to update the critical security parameters in a secure way, without the current CSPs or new CSPs to be updated to be visible to an eavesdropper. The CSPs that can be updated are shown in the preceding Table 4. Before any CSP can be updated, the host must have successfully authenticated itself to the memory in the Administrator role and retained the current Session Key. Only CSPs that are not locked may be updated.

The CSP update algorithm can be divided up into two different types of updates depending upon the CSP that is to be updated, because different CSPs have different bit lengths. The Key CSPs (KeyA, KeyU) are 128-bit CSPs and require a slightly different CSP update procedure than the other CSPs (HostID, MemID, and passwords) which are all 64-bit CSPs. Both procedures will be described below. The Key Update Algorithm is controlled by the CSP Update State Machine 126 and its communication is interfaced through the CMOS Register Map 106. The Key Update Algorithm can be broken down into four distinct transmissions, namely TX1, TX2, TX3, and TX4. After the TX4 transmission, both the Host and device have enough information to determine if the Key Update Algorithm has passed or failed.

To successfully complete the Key Update Algorithm, both the Host and the Device must share CSPs that must be kept secret. This includes the following CSPs:
 The unique 128-bit session key that was generated during the Administrator authentication procedure.
 The old 128-bit key that is to be updated (KeyA or KeyU).
 The Key that is to be updated, must not be in the locked state. The state of the keys can be determined by reading register 0x0000A.

Figure 12:
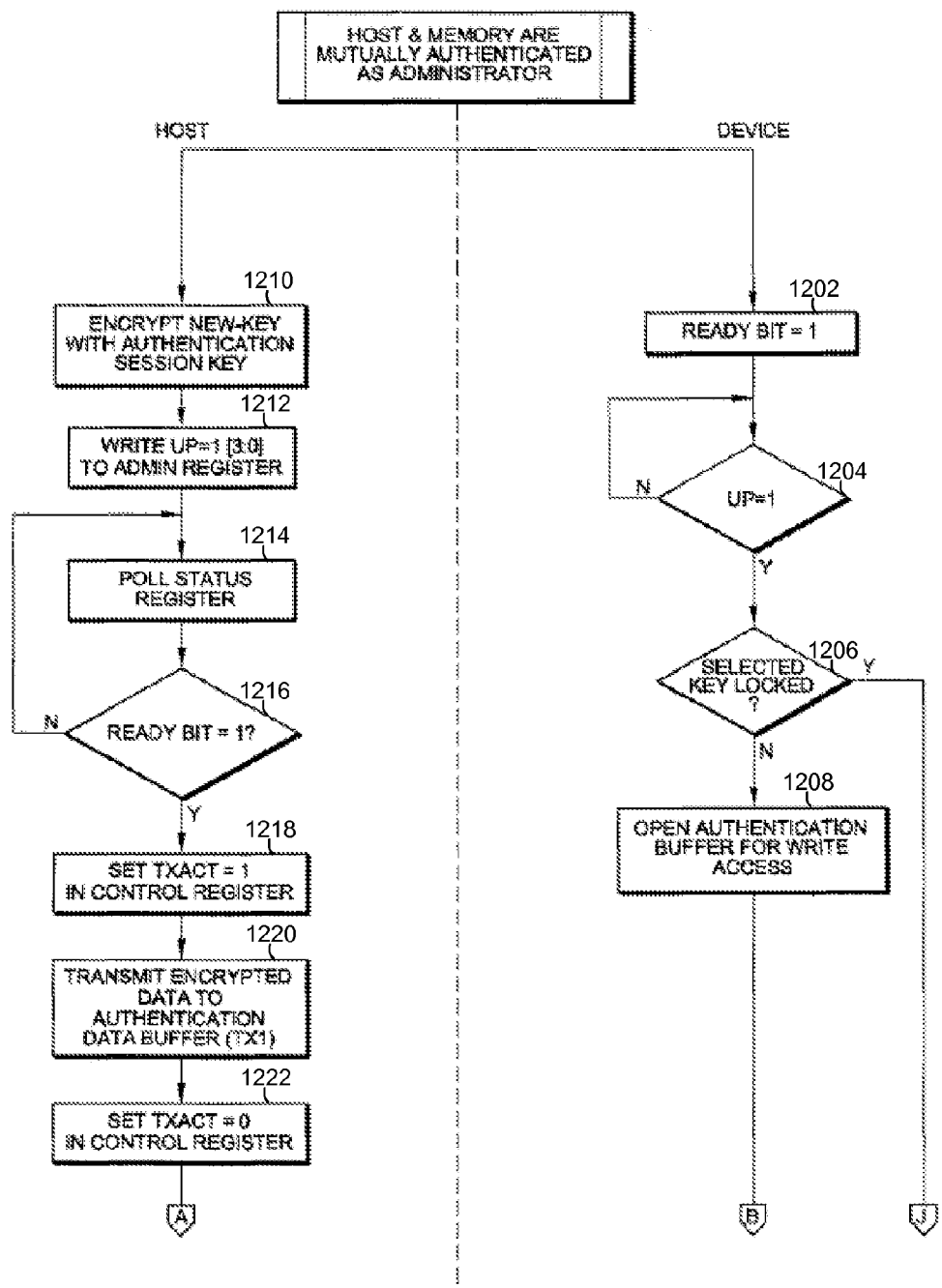
FIG. 12 is a representative flow chart for the TX1, key update algorithm in accordance with the representative embodiment of the present invention.

With reference additionally now to FIG. 12, a representative flow chart for TX1, key update algorithm in accordance with the representative embodiment of the present invention is shown. The Key Update Algorithm begins with the TX1 transmission.

Device:

1. The Device is ready for a Key Update Procedure when the Ready Bit is high (1202).

2. The Device checks if the UP bit is to be set in the Administrator Register (1204) and the selected key unlocked (1206). If it is, the Device opens the Authentication Data Buffer for write access (1208).

Host:

1. The Host begins by encrypting the New Key with the Session Key that was generated during the Administrator Authentication Procedure (1210).

2. The Host then selects which CSP is to be updated and sets the UP bit by writing to the Administrator Register (1212).

3. The Host then polls the Status Register (1214) to verify the Ready Bit is high (1216).

4. The Host must then set the TXACT bit in the Control Register to initiate the TX1 transmission (1218).

5. The Host must then write the encrypted result from #1 into the 128-bit Authentication Data Buffer (1220) such that:
 a. Address 0x00000=E(NewKey[127:0],SessionKey[127:0])[15:0]
 b. Address 0x00001=E(NewKey[127:0],SessionKey[127:0])[31:16]
 c. Address 0x00002=E(NewKey[127:0],SessionKey[127:0])[47:32]
 d. Address 0x00003=E(NewKey[127:0],SessionKey[127:0])[63:48]
 e. Address 0x00004=E(NewKey[127:0],SessionKey[127:0])[79:64]
 f. Address 0x00005=E(NewKey[127:0],SessionKey[127:0])[95:80]
 g. Address 0x00006=E(NewKey[127:0],SessionKey[127:0])[111:96]
 h. Address 0x00007=E(NewKey[127:0],SessionKey[127:0])[127:112]

This is the TX1 data transmission.

6. The Host must then clear the TXACT bit after the data has been written to the Authentication Data Buffer (1222).

Figure 13:
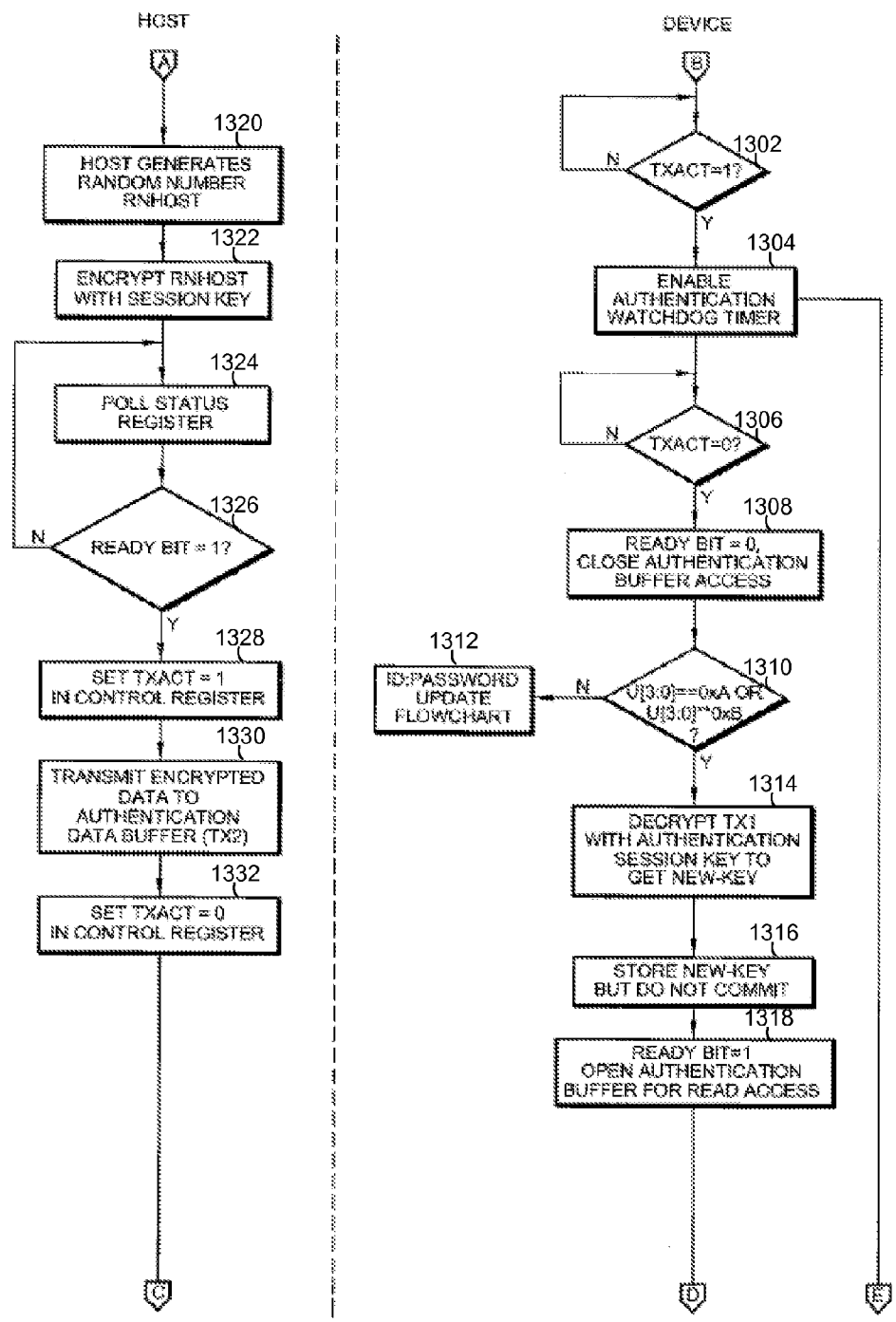
FIG. 13 is a representative flow chart for the TX2, key update algorithm in accordance with the representative embodiment of the present invention.

With reference additionally now to FIG. 13, a representative flow chart for the TX2, key update algorithm in accordance with the representative embodiment of the present invention is shown.

Device:

1. The Device waits for the TXACT bit to be set, indicating the Key Update Procedure has initiated (1302).

2. The Device then activates the Authentication Watchdog Timer to check that the Key Update Procedure completes in a finite amount of time (1304).

3. The Device then waits for the TXACT bit to be cleared, indicating that the TX1 transmission has completed (1306).

4. The Device clears the Ready Bit and closes the Authentication Data Buffer for read/write access (1308).

5. The Device then checks which CSP is to be updated (1310).
 a. If the CSP selected by U[3:0] in the Administrator Register is 0xA or 0xB, indicating a Key is to be updated, the Key Update Procedure then continues.
 b. If the selected CSP is not equal to 0xA or 0xB, then the ID/Password Update Procedure is initiated (1312).

6. The Device then decrypts the TX1 transmission in the Authentication Data Buffer using the Session Key that was generated in the Administrator Authentication Procedure (1314).

7. The Device then stores the decrypted New Key in non-volatile memory, but the Device does not yet commit to using this New Key until the procedure completes successfully (1316).

8. The Device then sets the Ready Bit and opens the Authentication Data Buffer for write access (1318). Host:

1. The Host begins by generating a new 128-bit random number, RNhost (1320).

2. The Host then encrypts RNhost using the Session Key that was generated from the Administrator Authentication Procedure (1322).

3. The Host then polls the Status Register (1324) and waits for the Ready Bit to be set high (1326).

4. The Host then sets the TXACT bit in the Control Register to initiate the TX2 data transmission (1328).

5. The Host must then write the encrypted result from #2 into the 128-bit Authentication Data Buffer (1330) such that:
 a. Address 0x00000=E(RNhost[127:0],SessionKey[127:0])[15:0]
 b. Address 0x00001=E(RNhost[127:0],SessionKey[127:0])[31:16]
 c. Address 0x00002=E(RNhost[127:0],SessionKey[127:0])[47:32]
 d. Address 0x00003=E(RNhost[127:0],SessionKey[127:0])[63:48]
 e. Address 0x00004=E(RNhost[127:0],SessionKey[127:0])[79:64]
 f. Address 0x00005=E(RNhost[127:0],SessionKey[127:0])[95:80]
 g. Address 0x00006=E(RNhost[127:0],SessionKey[127:0])[111:96]
 h. Address 0x00007=E(RNhost [127:0],SessionKey[127:0])[127:112]

This is the TX2 data transmission.

6. The Host must then clear the TXACT bit after the data has been written to the Authentication Data Buffer to indicate the TX2 transmission is complete (1332).

Figure 14:
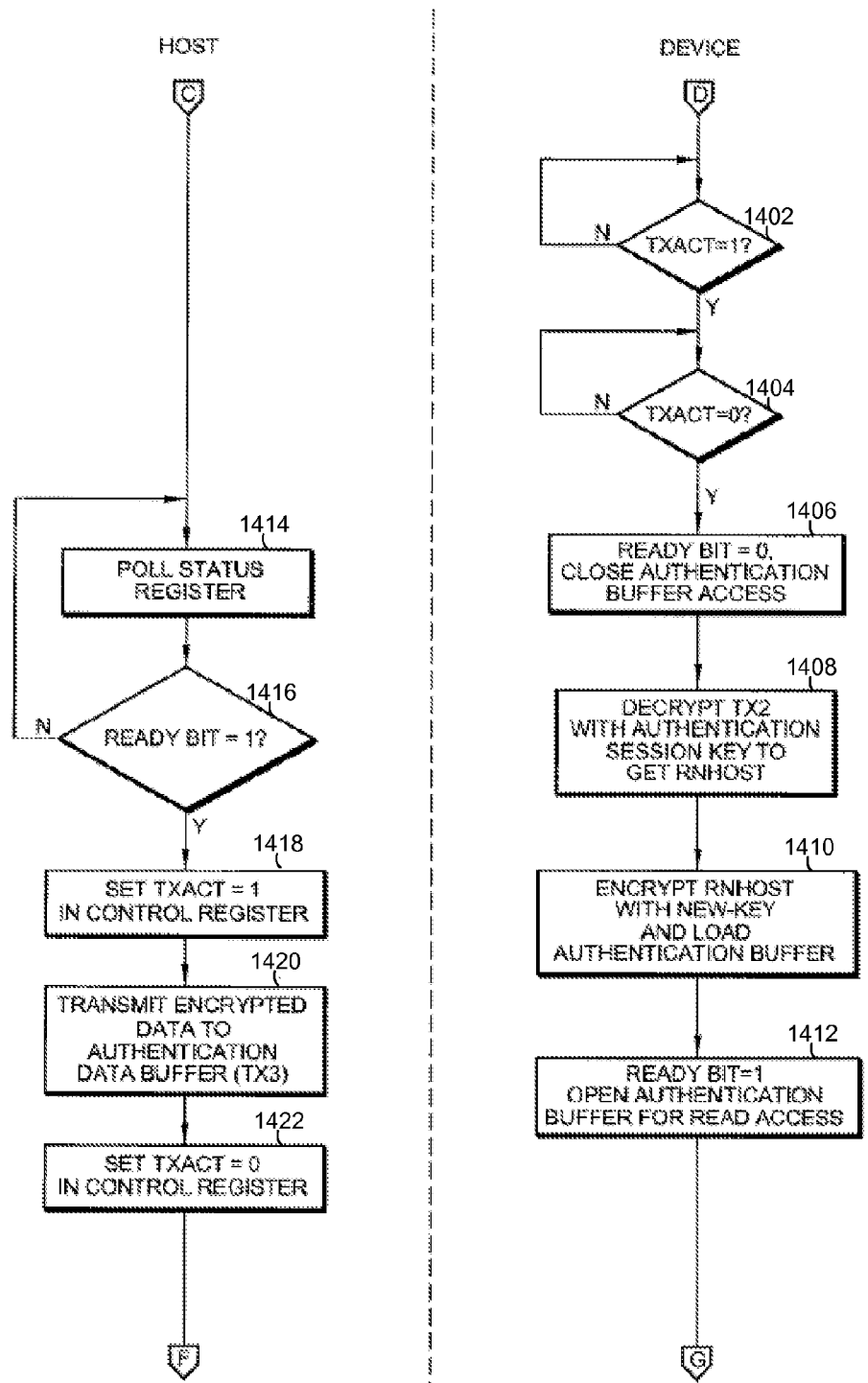
FIG. 14 is a representative flow chart for the TX3, key update algorithm in accordance with the representative embodiment of the present invention.

With reference additionally now to FIG. 14, a representative flow chart for the TX3, key update algorithm in accordance with the representative embodiment of the present invention is shown.

Device:

1. The Device waits for the TXACT bit to be set, indicating the Key Update TX2 transmission has initiated (1402).

2. The Device then waits for the TXACT bit to be cleared, indicating that the TX2 transmission has completed (1404).

3. The Device then clears the Ready Bit and closes the Authentication Data Buffer for read/write access (1406).

4. The Device then decrypts the TX2 transmission data in the Authentication Data Buffer using the Session Key generated from the Administrator Authentication Procedure to recover RNhost (1408).

5. The Device then encrypts the recovered RNhost from #4, encrypts it with the New Key that was decrypted from the TX1 transmission and loads this result into the Authentication Data Buffer (1410) such that:
 a. Address 0x00000=E(RNhost[127:0],NewKey[127:0])[15:0]
 b. Address 0x00001=E(RNhost[127:0],NewKey[127:0])[31:16]
 c. Address 0x00002=E(RNhost[127:0],NewKey[127:0])[47:32]
 d. Address 0x00003=E(RNhost[127:0],NewKey[127:0])[63:48]
 e. Address 0x00004=E(RNhost[127:0],NewKey[127:0])[79:64]

f. Address 0x00005=E(RNhost[127:0],NewKey[127:0]) [95:80]

g. Address 0x00006=E(RNhost[127:0],NewKey[127:0]) [111:96]

h. Address 0x00007=E(RNhost[127:0],NewKey[127:0]) [127:112]

6. The Device then sets the Ready Bit and opens the Authentication Data Buffer for read access, indicating that the TX3 data is ready for transmission to the Host (1412).

Host:

1. The Host begins by polling the Ready Bit high in the Status Register indicating that the TX3 data is ready to be read by the Host (1414 and 1416).

2. The Host then sets the TXACT bit in the Control Register to initiate the TX3 data transmission (1418).

3. The Host must then read the encrypted result from the Authentication Data Buffer (1420). This is the TX3 data transmission.

4. The Host must then clear the TXACT bit after the data has been written to the Authentication Data Buffer to indicate the TX2 transmission is complete (1422).

Figure 15:
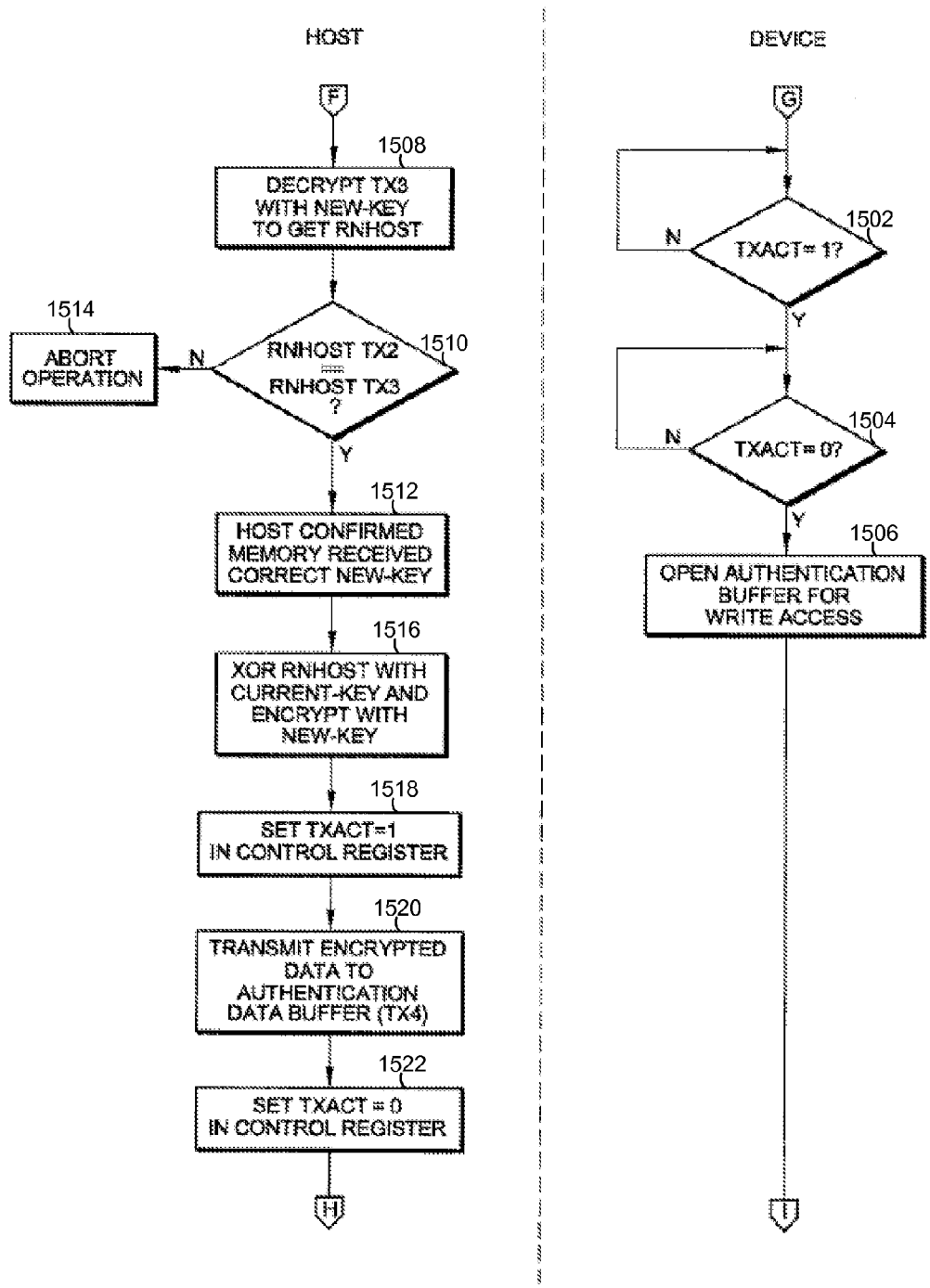
FIG. 15 is a representative flow chart for the TX4, key update algorithm in accordance with the representative embodiment of the present invention.

With reference additionally now to FIG. 15, a representative flow chart for the TX4, key update algorithm in accordance with the representative embodiment of the present invention is shown.

Device:

1. The Device waits for the TXACT bit to be set, indicating the Key Update TX3 transmission has initiated (1502).

2. The Device then waits for the TXACT bit to be cleared, indicating that the TX3 transmission has completed (1504).

3. The Device then clears and opens the Authentication Data Buffer for write access and waits for the TX4 transmission (1506).

Host:

1. The Host begins by decrypting the TX3 transmission using the New Key as the key to recover the RNhost random number (1508).

2. The Host then verifies that the decrypted RNhost from TX3 matches the original RNhost value sent to the Device in the TX1 transmission (1510).

a. If there is a match, the Host has confirmed that the Device has received the correct New Key (1512).

b. If there is not a match, the Host has not received the correct New Key, or there was an error in one or more of the transmissions. The Host should abort the procedure (1514) by either waiting until the Authentication watchdog timer times out, or it can continue the procedure and send incorrect data in the TX4 transmission, forcing the Device to abort committing to the New Key.

3. To now allow the Device to commit to the New Key, the Host XOR's RNhost with the current value of the key to be updated and encrypts the result of the XOR with the New Key (1516).

4. The Host then sets the TXACT bit in the Control Register to initiate the TX4 data transmission (1518).

5. The Host must then write the encrypted result from #3 into the 128-bit Authentication Data Buffer (1520) such that:

a. Address 0x00000=E(XOR(RNhost[127:0],Current Key [127:0]),NewKey[127:0]) [15:0]

b. Address 0x00001=E(XOR(RNhost[127:0],Current Key [127:0]),NewKey[127:0]) [31:16]

c. Address 0x00002=E(XOR(RNhost[127:0],Current Key [127:0]),NewKey[127:0]) [47:32]

d. Address 0x00003=E(XOR(RNhost[127:0],Current Key [127:0]),NewKey[127:0])[63:48]

e. Address 0x00004=E(XOR(RNhost[127:0],Current Key [127:0]),NewKey[127:0])[79:64]

f. Address 0x00005=E(XOR(RNhost[127:0],Current Key [127:0]),NewKey[127:0])[95:80]

g. Address 0x00006=E(XOR(RNhost[127:0],Current Key [127:0]),NewKey[127:0])[111:96]

h. Address 0x00007=E(XOR(RNhost[127:0],Current Key [127:0]),NewKey[127:0])[127:112]

This is the TX4 data transmission.

6. The Host must then clear the TXACT bit after the data has been written to the Authentication Data Buffer to indicate the TX4 transmission is complete (1522).

Figure 16:
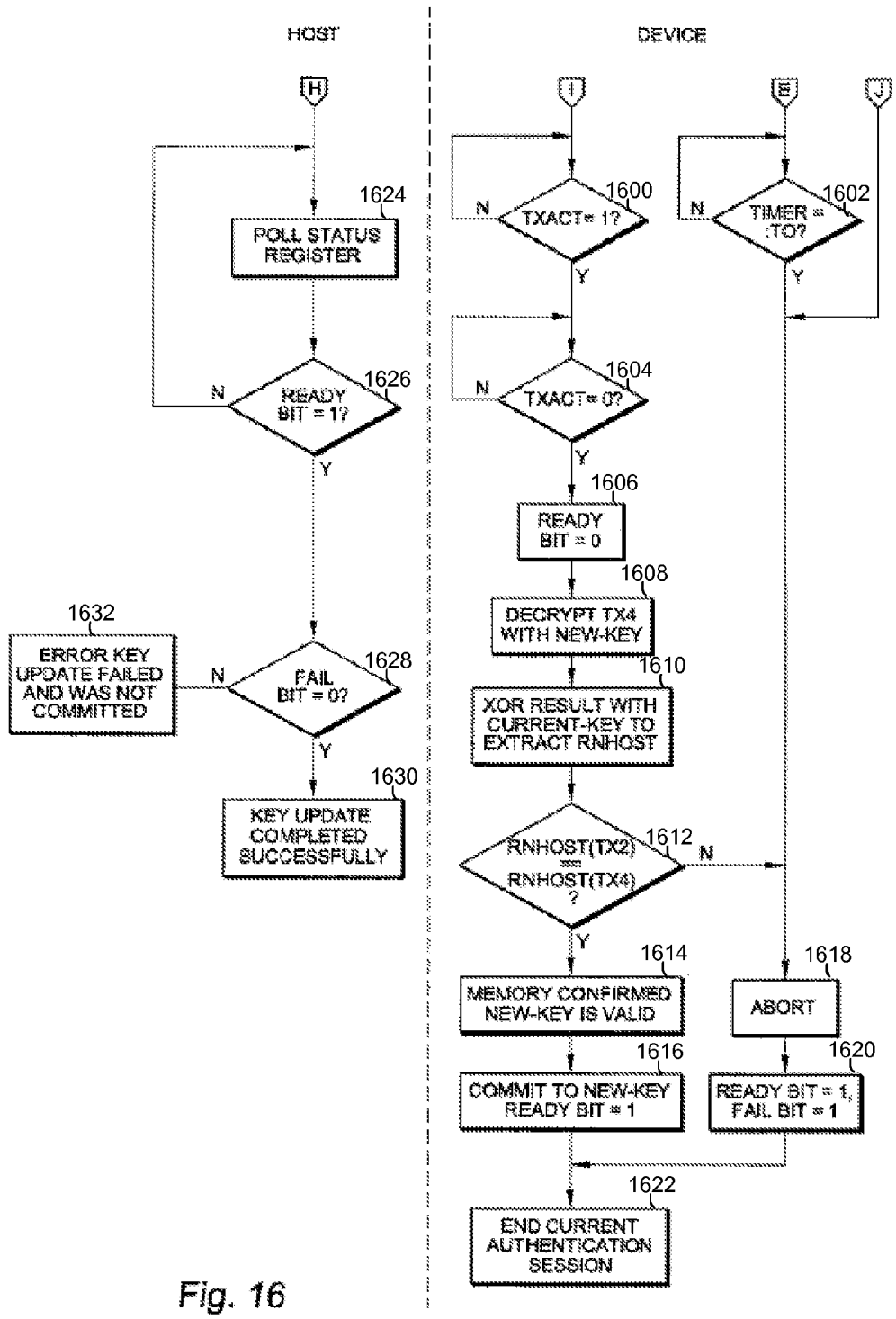
FIG. 16 is a representative flow chart for the commit key update algorithm in accordance with the representative embodiment of the present invention.

With reference additionally now to FIG. 16, a representative flow chart for the commit key update algorithm in accordance with the representative embodiment of the present invention is shown.

Device:

1. The Device waits for the TXACT bit to be set, indicating the Key Update TX4 transmission has initiated (1600) while continually monitoring the Authentication watchdog timer (1602).

2. The Device then waits for the TXACT bit to be cleared, indicating that the TX4 transmission has completed (1604).

3. The Device then sets the Ready Bit low (1606) and decrypts the TX4 transmission in the Authentication Data Buffer using the New Key that was decrypted and stored from the TX1 transmission (1608).

4. The Device then XOR's the decrypted result with the Current Key that is to be replaced to extract RNhost (1610).

5. The Device then checks to see if RNhost from the TX2 transmission matches RNhost from the extracted value in step #4 (1612).

a. If RNhost from TX2 matches RNhost from TX4/the Device has confirmed that the Host wants to commit to the New Key (1614), and the New Key is committed in nonvolatile memory (1616). The previous Key is discarded.

b. If RNhost from TX2 does not match RNhost from TX4, the Device has confirmed that the Host does not want to commit to the New Key, and the New Key is discarded. The current Key is retained (1618). The Fail Bit in the Status Register is set (1620).

6. The Ready Bit is set and the current Administrator Authentication session is terminated (1622).

Host:

1. The Host polls the Status Register (1624) and waits for the Ready Bit to go high (1626).

2. The Host then checks the state of the Fail Bit in the Status Register (1628).

a. If the Fail Bit is low, the Key Update

Procedure completed successfully and the New Key has been committed (1630).

b. If the Fail Bit is high, the Key Update Procedure did not complete successfully and the original Key has been retained (1632).

Figure 17:
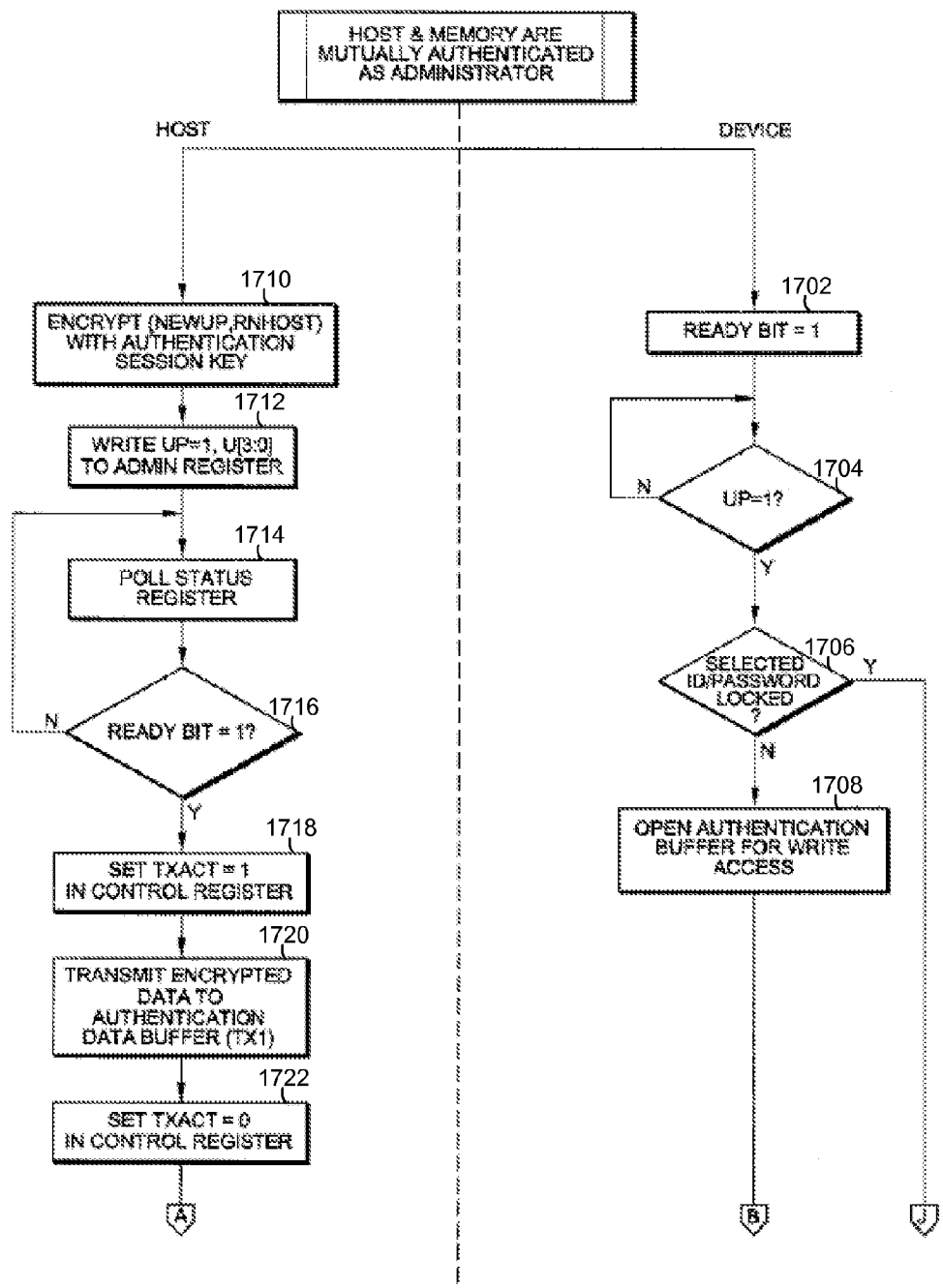
FIG. 17 is a representative flow chart for the TX1, ID/Password update algorithm in accordance with the representative embodiment of the present invention.

With reference additionally now to FIG. 17, a representative flow chart for the TX1, ID/Password update algorithm in accordance with the representative embodiment of the present invention is shown.

The ID/Password Update Algorithm is controlled by the CSP Update State Machine 126 and its communication is interfaced through CMOS Register Map 106. The ID/Password Update Algorithm can be broken down into three distinct transmissions, namely TX1, TX2, and TX3. After the TX3 transmission, both the Host and device have enough information to determine if the ID/Password Update Algorithm has passed or failed.

To successfully complete the ID/Password Update Algorithm, both the Host and the Device must share CSPs that must be kept secret. This includes the following CSPs:

The unique 128-bit session key that was generated during the Administrator authentication procedure.

The old 64-bit ID/password that is to be updated (HostID, MemID, PWD1U, PWD2U, PWD1A, PWD2A, PWDR, PWDW, PWDADM).

The ID/Password that is to be updated, must not be in the locked state. The state of the IDs/Passwords can be determined by reading register 0x0000A.

The ID/Password Update Algorithm begins with the TX1 transmission.

Device:

1. The Device is ready for an ID/Password Update Procedure when the Ready Bit is high (1702).

2. The Device checks if the UP bit is to be set in the Administrator Register (1704) and the selected ID/Password unlocked (1706). If it is, the Device opens the Authentication Data Buffer for write access (1708).

Host:

1. The Host begins by generating a 64-bit random number.

2. The Host then encrypts the concatenation of {New ID/Password [63:0], RNhost[63:0]} with the Session Key that was generated during the Administrator Authentication Procedure (1710).

3. The Host then selects which CSP is to be updated and sets the UP bit by writing to the Administrator Register (1712).

4. The Host then polls the Status Register (1714) to verify the Ready Bit is high (1716).

5. The Host must then set the TXACT bit in the Control Register to initiate the TX1 transmission (1718).

6. The Host must then write the encrypted result from #1 into the 128-bit Authentication Data Buffer (1720) such that:

a. Address 0x00000=E({NewI/P[63:0],RNhost[63:0]}, SessionKey[127:0]) [15:0]

b. Address 0x00001=E({NewI/P[63:0],RNhost[63:0]}, SessionKey[127:0]) [31:16]

c. Address 0x00002=E({NewI/P[63:0],RNhost[63:0]}, SessionKey[127:0]) [47:32]

d. Address 0x00003=E({NewI/P[63:0],RNhost[63:0]}, SessionKey[127:0]) [63:48]

e. Address 0x00004=E({NewI/P[63:0],RNhost[63:0]}, SessionKey[127:0]) [79:64]

f. Address 0x00005=E({NewI/P[63:0],RNhost[63:0]}, SessionKey[127:0])[95:80]

g. Address 0x00006=E({NewI/P[63:0],RNhost[63:0]}, SessionKey[127:0]) [111:96]

h. Address 0x00007=E({NewI/P[63:0],RNhost[63:0]}, SessionKey[127:0]) [127:112]

This is the TX1 data transmission.

7. The Host must then clear the TXACT bit after the data has been written to the Authentication Data Buffer (1722).

Figure 18:
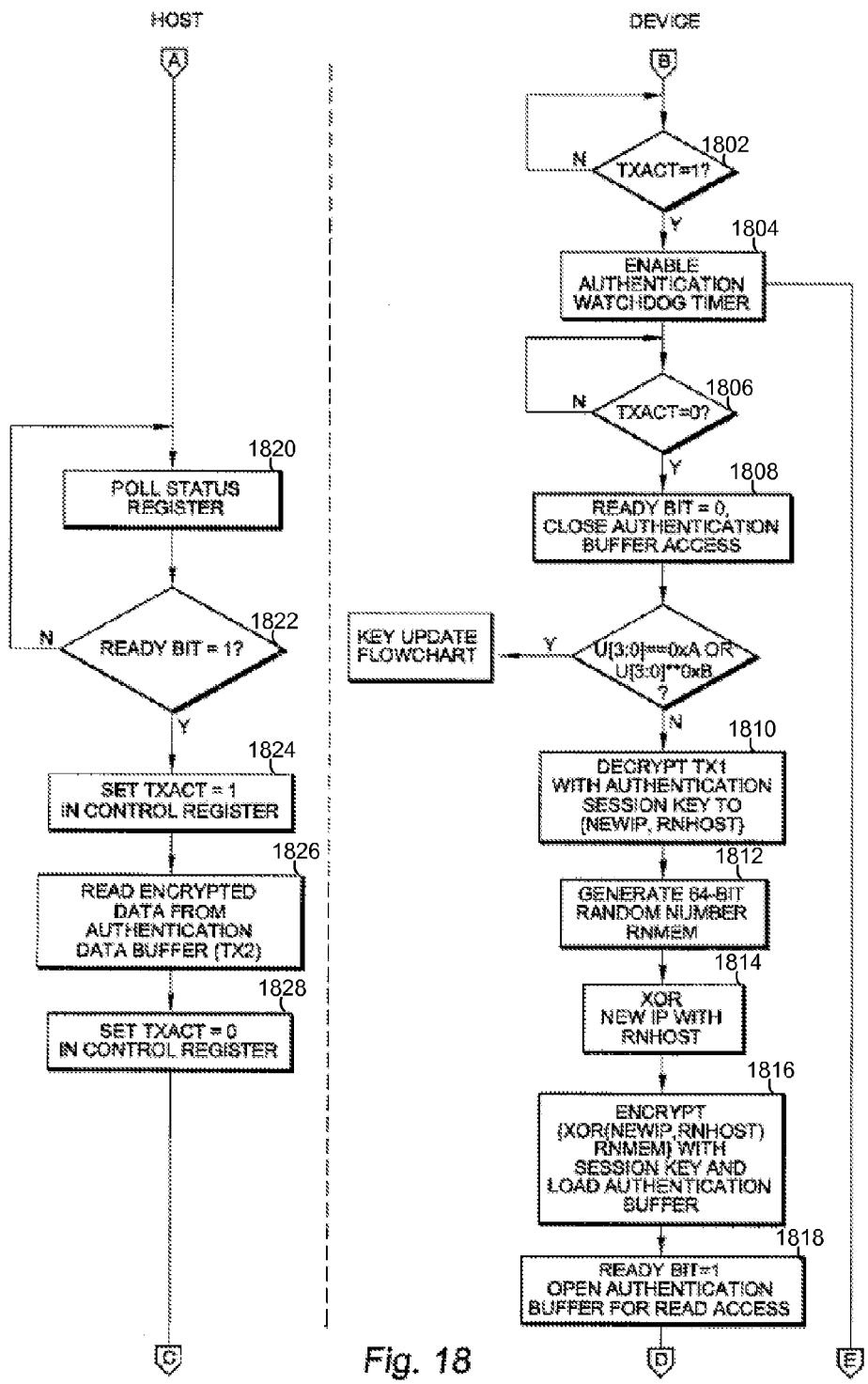
FIG. 18 is a representative flow chart for the TX2, ID/Password update algorithm in accordance with the representative embodiment of the present invention.

With reference additionally now to FIG. 18, a representative flow chart for the TX2, ID/Password update algorithm in accordance with the representative embodiment of the present invention is shown.

Device:

1. The Device waits for the TXACT bit to be set, indicating the Key Update TX1 transmission has initiated (1802).

2. The Device then starts the Authentication Watchdog Timer (1804). The entire ID/Password Update Procedure must complete before this timer times out, or else the ID/Password Update Procedure is aborted and the original ID/Password is retained.

3. The Device then waits for the TXACT bit to be cleared, indicating that the TX1 transmission has completed (1806).

4. The Device then clears the Ready Bit and closes the Authentication Data Buffer for read/write access (1808).

5. The Device then decrypts the TX2 transmission data in the Authentication Data Buffer using the Session Key generated from the Administrator Authentication Procedure to recover {NewI/P[63:0],RNhost[63:0]} (1810).

6. The Device then generates a 64-bit random number, RNmem[63:0] (1812).

7. The Device then XOR's the decrypted NewI/P[63:0] with the decrypted RNhost[63:0] from step #5 (1814).

8. The Device then encrypts the concatenation of {XOR (NewI/P[63:0],RNhost[63:0]),RNmem[63:0]} and encrypts it with the Session Key that was generated from the Administrator Authentication Procedure and loads this result into the Authentication Data Buffer (1816) such that:

a. Address 0x00000=E ({XOR (NewI/P [63: 0], RNhost [63: 0]), RNmem [63: 0]}, SessionKey[127:0]) [15:0]

b. Address 0x00001 E({XOR(NewI/P[63:0],RNhost[63:0]),RNmem[63:0] }, SessionKey[127:0]) [31:16]

c. Address 0x00002=E({XOR(NewI/P[63:0],RNhost[63:0]),RNmem[63:0] }, SessionKey[127:0]) [47:32]

d. Address 0x00003=E({XOR(NewI/P[63:0],RNhost[63:0]),RNmem[63:0] }, SessionKey[127:0]) [63:48]

e. Address 0x00004=E({XOR(NewI/P[63:0],RNhost[63:0]),RNmem[63:0] }, SessionKey[127:0]) [79:64]

f. Address 0x00005=E({XOR(NewI/P[63:0],RNhost[63:0]),RNmem[63:0]}, SessionKey[127:0]) [95:80]

g. Address 0x00006=E({XOR(NewI/P[63:0],RNhost[63:0]),RNmem[63:0] }, SessionKey[127:0]) [111:96]

h. Address 0x00007=E({XOR(NewI/P[63:0],RNhost[63:0]),RNmem[63:0] }, SessionKey[127:0]) [127:112]

9. The Device then sets the Ready Bit and opens the Authentication Data Buffer for read access, indicating that the TX2 data is ready for transmission to the Host (1818).

Host:

1. The Host begins by polling (1820) the Ready Bit high in the Status Register indicating that the TX2 data is ready to be read by the Host (1822).

2. The Host then sets the TXACT bit in the Control Register to initiate the TX2 data transmission (1824).

3. The Host must then read the encrypted result from the Authentication Data Buffer (1826). This is the TX2 data transmission.

4. The Host must then clear the TXACT bit after the data has been written to the Authentication Data Buffer to indicate the TX2 transmission is complete (1828).

Figure 19:
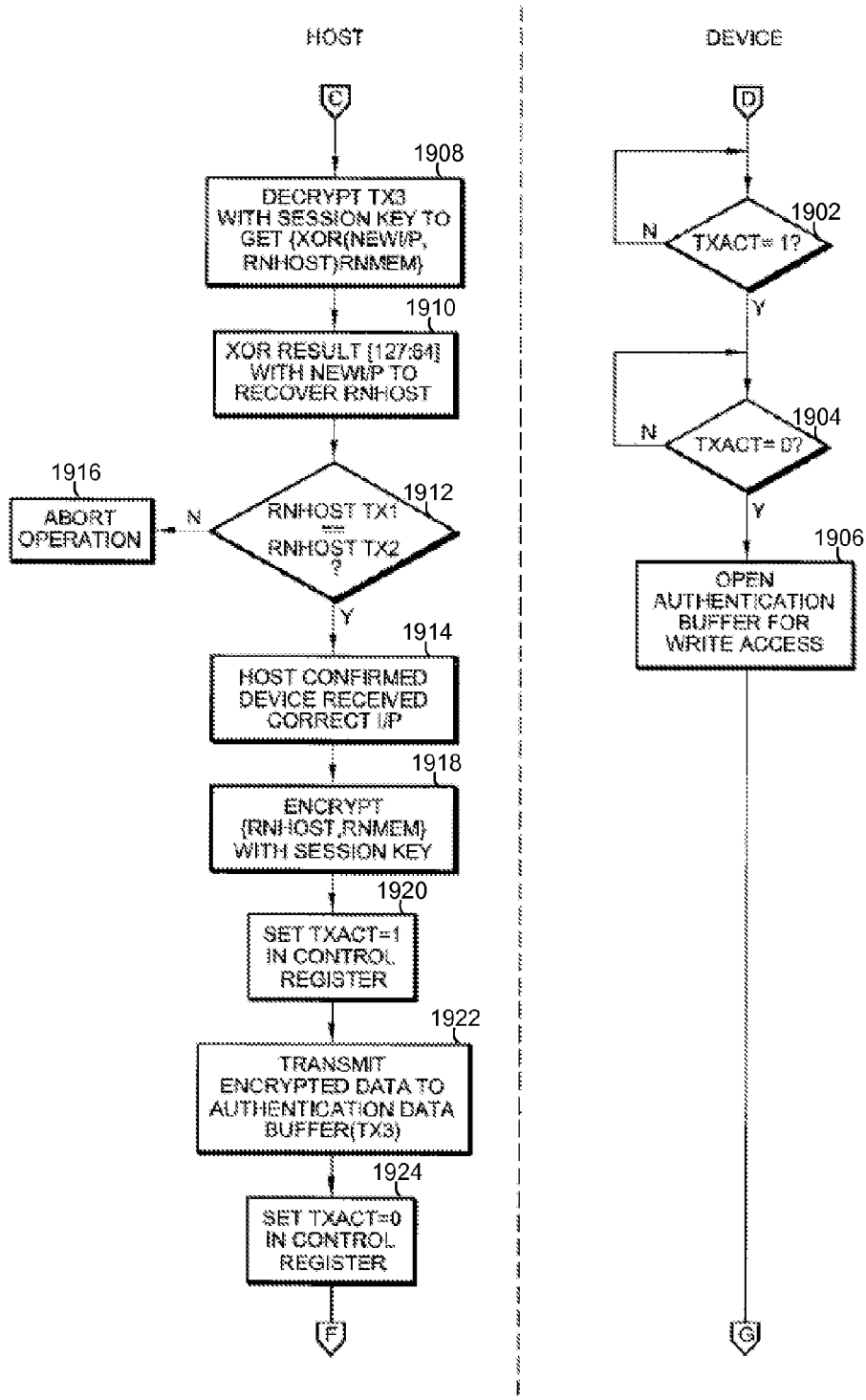
FIG. 19 is a representative flow chart for the TX3, ID/Password update algorithm in accordance with the representative embodiment of the present invention.

With reference additionally to FIG. 19, a representative flow chart for the TX3, ID/Password update algorithm in accordance with the representative embodiment of the present invention is shown.

Device:

1. The Device waits for the TXACT bit to be set, indicating the Key Update TX2 transmission has initiated (1902).

2. The Device then waits for the TXACT bit to be cleared, indicating that the TX2 transmission has completed (1904).

3. The Device then clears opens the Authentication Data Buffer for write access and waits for the TX3 transmission (1906).

Host:

1. The Host begins by decrypting the TX2 transmission using the Session Key to recover {XOR(NewI/P[63:0],RNhost[63:0]),RNmem[63:0]} (1908).

2. The Host then verifies that the decrypted RNhost from TX2 matches the original RNhost value sent to the Device in the TX1 transmission (1910) and (1912).

a. If there is match, the Host has confirmed that the Device has received the correct New ID/Password (1914).

b. If there is not a match, the Host has not received the correct New Password/ID, or there was an error in one or more of the transmissions. The Host should abort the procedure by either waiting until the Authentication Watchdog Timer times out, or it can continue the procedure and send incorrect data in the TX3 transmission, forcing the Device to abort committing to the New Password/ID (1916).

3. To now allow the Device to commit to the New Password/ID, the Host encrypts {RNhost,RNmem} using the Session Key from the Administrator Authentication Procedure (1918).

4. The Host then sets the TXACT bit in the Control Register to initiate the TX4 data transmission (1920).

5. The Host must then write the encrypted result from #3 into the 128-bit Authentication Data Buffer (1922) such that:

a. Address 0x00000=E({RNhost[63:0],RNmem[63:0]}, SessionKey[127:0]) [15:0]

b. Address 0x00001=E({RNhost[63:0],RNmem[63:0]}, SessionKey[127:0]) [31:16]

c. Address 0x00002=E({RNhost[63:0],RNmem[63:0]}, SessionKey[127:0]) [47:32]

d. Address 0x00003=E({RNhost[63:0],RNmem[63:0]}, SessionKey[127:0]) [63:48]

e. Address 0x00004=E({RNhost[63:0],RNmem[63:0]}, SessionKey[127:0]) [79:64]

f. Address 0x00005=E({RNhost[63:0],RNmem[63:0]}, SessionKey[127:0]) [95:80]

g. Address 0x00006=E({RNhost[63:0],RNmem[63:0]}, SessionKey[127:0]) [111:96]

h. Address 0x00007=E({RNhost[63:0],RNmem[63:0]}, SessionKey[127:0]) [127:112]

This is the TX3 data transmission.

6. The Host must then clear the TXACT bit after the data has been written to the Authentication Data Buffer to indicate the TX3 transmission is complete (1924).

Figure 20:
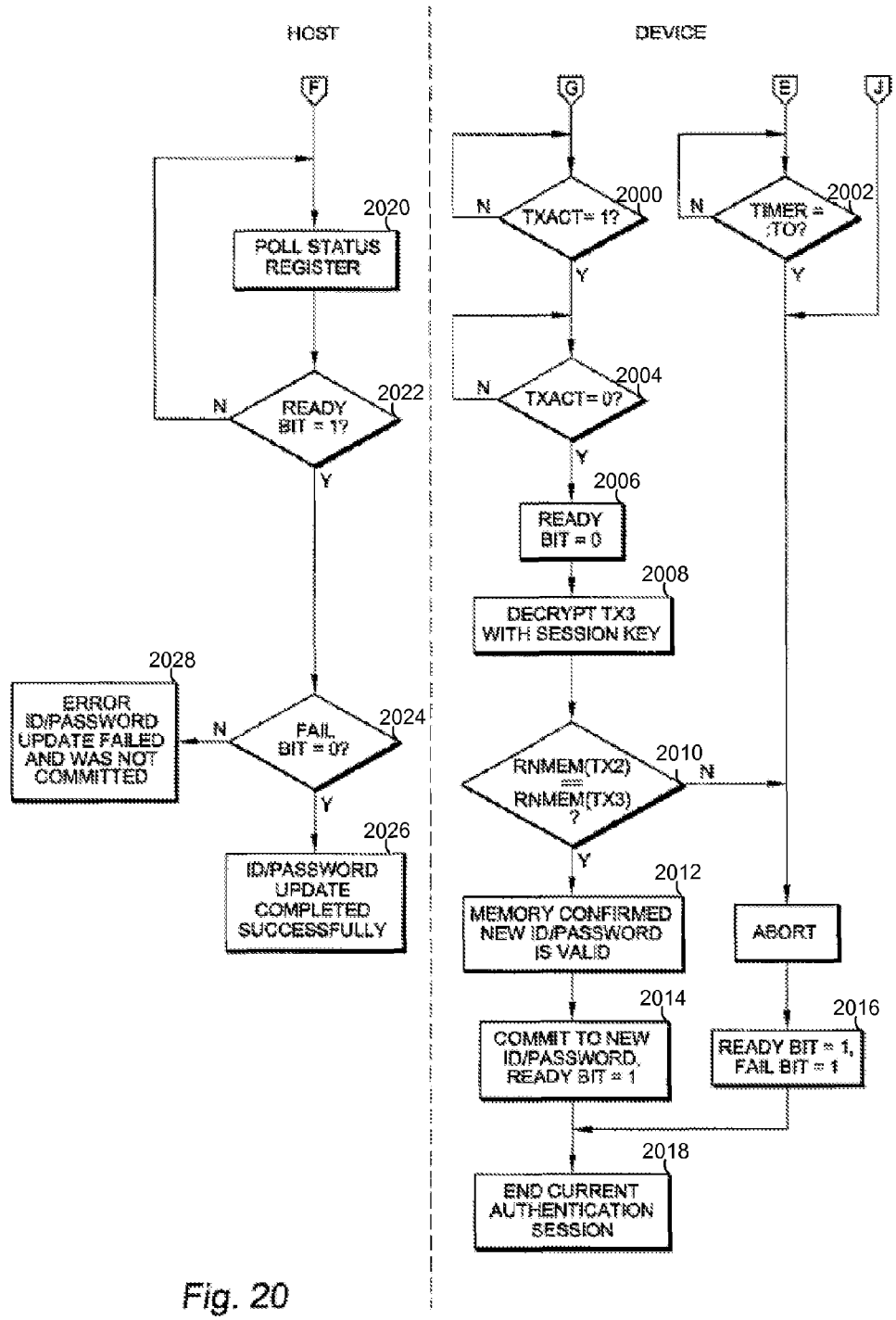
FIG. 20 is a representative flow chart for the commit ID/Password update algorithm in accordance with the representative embodiment of the present invention.

With reference additionally now to FIG. 20, a representative flow chart for the commit ID/Password update algorithm in accordance with the representative embodiment of the present invention is shown.

Device:

1. The Device waits for the TXACT bit to be set, indicating the Key Update TX3 transmission has initiated (2000) while continually monitoring the Authentication watchdog timer (2002).

2. The Device then waits for the TXACT bit to be cleared, indicating that the TX3 transmission has completed (2004).

3. The Device then sets the Ready Bit low (2006) and decrypts the TX3 transmission in the Authentication Data Buffer using the Session Key that was generated from the Administrator Authentication Procedure (2008).

4. The Device then checks to see if RNmem from the TX2 transmission matches RNmem from the decrypted value in step #3 (2010).

a. If RNmem from TX2 matches RNmem from TX3, the Device has confirmed that the Host wants to commit to the New ID/Password (2012), and the New ID/Password is committed in non-volatile memory (2014). The previous ID/Password is discarded.

b. If RNmem from TX2 does not match RNmem from TX3, the Device has confirmed that the Host does not want to commit to the New ID/Password, and the New ID/Password is discarded. The current ID/Password is retained. The Fail Bit in the Status Register is set (2016).

5. The Ready Bit is set and the current Administrator Authentication session is terminated (2018).

Host:

1. The Host polls the Status Register (2020) and waits for the Ready Bit to go high (2022).

2. The Host then checks the state of the Fail Bit in the Status Register (2024).

a. If the Fail Bit is low, the ID/Password Update Procedure completed successfully and the New ID/Password has been committed (2026).

b. If the Fail Bit is high, the ID/Password Update Procedure did not complete successfully and the original ID/Password has been retained (2028).

If the Host or Device determines that an unauthorized party is attempting to access the Device, the Host or Device may wish to destroy the memory array contents and CSPs. The Instant Erase Algorithm has the following key features:

1. The erase algorithm should occur as fast as possible to minimize the time between an erase request and the destruction of the contained data.

2. If the erase algorithm is interrupted by any means, for instance by removing power to the Device while the Erase Algorithm is in progress, the Device must stay in the erase state until the entire erase algorithm has completed even after power has been 2 0 restored.

3. No access to the Device must be allowed until the Erase Algorithm has fully completed.

4. Once the Erase Algorithm has completed, the Device is returned to an initialize state with all memory contents and CSPs cleared to O's such that the Device can be reused if necessary. Three possibilities are available to erase the user memory contents and the CSPs:

1. The slowest, but lowest power approach is to sequence through each user memory 16-bit word and write it to 0x0000 starting at the lowest order address and incrementing through each address until the user memory is written entirely to 0's. Then the CSP memory is erased in the same fashion, one 16-bit word at a time until all CSPs are written to 0's. Erasing the user memory first ensures that in case the Erase Algorithm is broken by some unanticipated means, the memory contents that have not yet been erased will still be protected by the unaltered CSPs. This is the primary means of the Erase Algorithm for this Device. Using this approach the entire Device can be erased in less than 100 ms.

2. A faster approach that is similar to the above is to write multiple 16-bit words to 0x0000 simultaneously. This approach speeds up the erase time but also increases active power during the erase. A testmode on the Device is capable of this type of operation.

3. The fastest approach is for the memory array to enter a mode where all memory wordlines are activated, all memory bitlines are grounded and all memory platelines are activated. This effect can polarize a very large number of ferroelectric capacitors in the same direction, instantly overwriting any stored data. Alternatively, all memory bitlines could be activated high while keeping all platelines low. This would polarize all memory bits in the opposite direction. This method consumes the greatest amount of power and is dependent on the size of the memory array. The memory array could be divided into sections where each section is erased one at a time to reduce power consumption. The Device could conceivably be erased in 10's of microseconds using this approach. A testmode on the Device is capable of this type of operation. The Erase Algorithm is initiated if any of the following events occur:

1. The Device's ERS pin is driven high by the Host.

2. The Host sets the EE bit in the Control Register.

3. The number of failed authentication attempts exceeds the value set in the Administrator Register nonvolatile MF1/MF0 bits.

Flag bits in the Administrator Register indicate the source of the erase. The EP flag indicates if the Device was erased by the ERS pin. The EC flag indicates if the Host set the EE bit in the Control Register. The EA flag indicates if maximum number of failed authentication attempts was exceeded. The flag bits are set at the moment the erase event occurs and are retained in non-volatile memory through the Erase Algorithm.

The Erase Algorithm has priority over any other Device operation. Any operation may be interrupted to start the Erase Algorithm. If the Device powers up and identifies and determines that a previous Erase Algorithm has not completed, the Device will immediately return to the Erase Algorithm until the Erase Algorithm fully completes.

Figure 21:
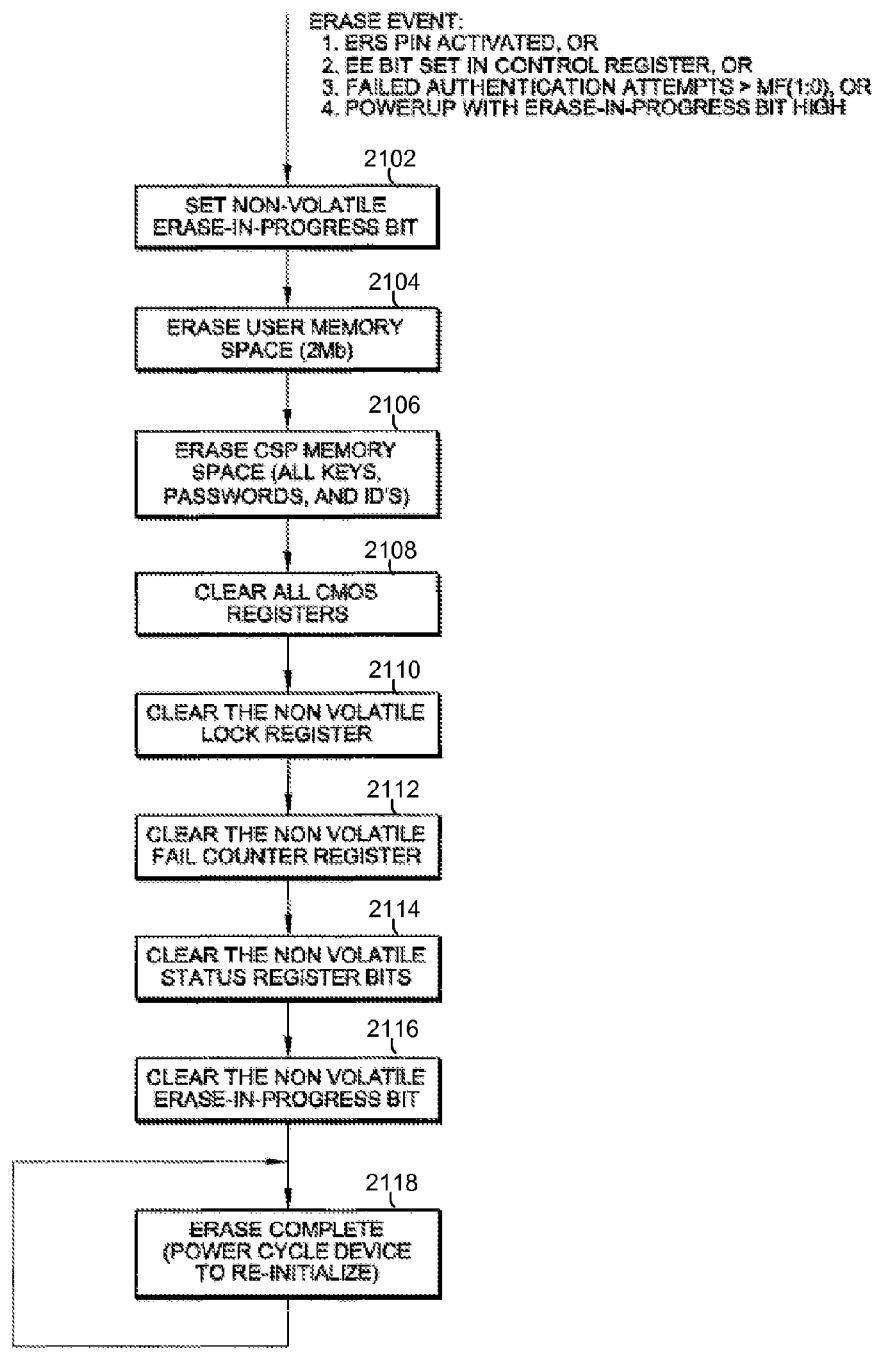
FIG. 21 is a representative flow chart for the erase algorithm in accordance with the representative embodiment of the present invention.

With reference additionally now to FIG. 21, a representative flow chart for the erase algorithm in accordance with the representative embodiment of the present invention is shown.

1. The Erase Algorithm is initiated by one of the three possible erase sources.

2. A non-volatile Erase-In-Progress bit is set to indicate an erase operation is in progress (2102). The state of this bit is checked when the Device powers up in case an erase operation was interrupted by a loss of power. At this point, all access to the F-RAM memory, except the Status Register, is blocked.

3. The 2 Mb User Memory Space is erased (written to 0x0000) one 16-bit word at a time starting at address 0x00000 and ending at address 0x1FFFF (2104).

4. The CSP Memory Space is erased (written to 0's) one 16-bit word at a time (2106).

5. The CMOS registers are cleared to destroy any interim information that may have been stored in CMOS when the Erase Algorithm started (2108).

6. Then the Lock Register (2110), Fail Counter Register (2112) and non-volatile Status Register bits are cleared (2114).

7. The non-volatile Erase-In-Progress bit is then cleared to indicate the completion of the Erase Algorithm (2116).

8. The Device then waits in an Erase Complete state (2118). At this point, the Device must be power cycled. After the power cycle, the device will power up in an initialized state, with all keys, passwords and ID's set to 0's.

In the representative embodiment of the present invention disclosed herein, a True Hardware Random Number Generator (THRNG) is used to produce a random bit stream. This random bit stream is collected and used to generate the 128-bit and 64-bit random numbers that are used in the authentication and CSP update algorithms described previously. The resultant random number that is produced should be as difficult as possible to reproduce under the exact same input conditions, since the security of the authentication can be compromised if the random number can be guessed. This novel design generates a highly effective amount of randomness that is not very dependent upon external conditions.

Figure 22:
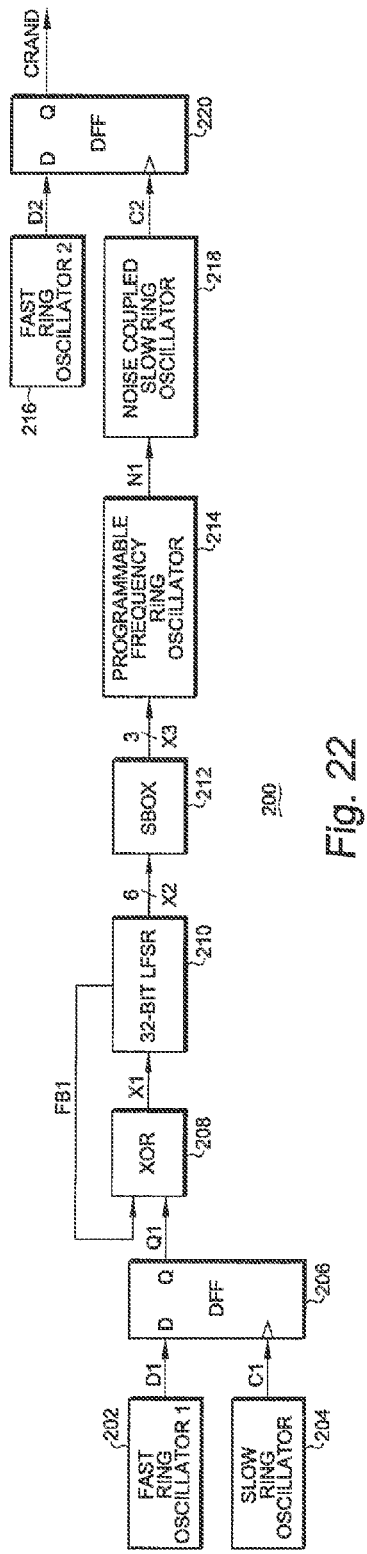
FIG. 22 is a representative functional block diagram of a true hardware random number generator design for possible utilization with the representative embodiment of the present invention.

With reference additionally now to FIG. 22, a representative functional block diagram of a true hardware random number generator (THRNG) 200 design for possible utilization with the representative embodiment of the present invention is shown.

The THRNG begins with a slow ring oscillator 204 sampling a fast ring oscillator 202. The two oscillators 202, 204 are independent, so occasionally the D flip-flop (DFF) 206 will capture a metastable condition, where the output of the DFF 206 will randomly resolve to a n1" or to a no" on the Q1 output. The output of the DFF 206 is then exclusive OR'ed (by XOR gate 208) with the feedback path, node FB1, inside a 32-bit linear feedback shift register (LFSR) 210. The LFSR 210 by itself produces a pseudo-random sequence of 32-bit numbers that is 2A32-1 bits long before the sequence repeats. Exclusive OR'ing its feedback path with the metastable randomness of Q1 randomizes the result even further.

Six bits of the 32-bit LFSR output are then chosen by the designer at random to be input into a non-linear substitution function called the SBOX 212. The function of this block is to substitute a 16-bit value for any 64-bit input. This function should be inherently nonlinear. For the Device, one of the eight DES SBOX's was chosen to provide this nonlinear function.

Three of the four bits output by the SBOX 212 are then fed into the input of programmable frequency ring oscillator 214. The three bits provide eight possible frequencies which are chosen to not be multiples of each other. As the output of the SBOX changes, the Programmable Frequency Ring Oscillator 214 randomly switches between its eight possible output frequencies.

This randomly variable frequency is then capacitively coupled into another low frequency ring oscillator 218 to introduce a significant amount of random jitter to the output of this ring oscillator. This randomness is generated primarily by all of the previous components described and less on the external stimulus to the THRNG, such as voltage and temperature.

This slow clock with a high percentage of random jitter is then used to sample a high frequency clock (from fast ring oscillator 216) using a D flip-flop 220 that will again capture metastable conditions producing a truly random bitstream output at QRAND. Because of the high percentage of jitter in the capture clock, metastable events will be generated on a much more frequent basis than the first D flip-flop 206.

The THRNG 200 is powered up and allowed to run for several milliseconds to allow many metastable events to accumulate. After this time period, a 128-bit bitstream from the THRNG 200 is captured and is used as a seed for another pseudo-random number generator (PRNG). Periodically the THRNG 200 is restarted to generate a new seed for the PRNG.

The ring oscillators used in the particular representative system design disclosed are an important factor in achieving the randomness required in the system.

Figure 23:
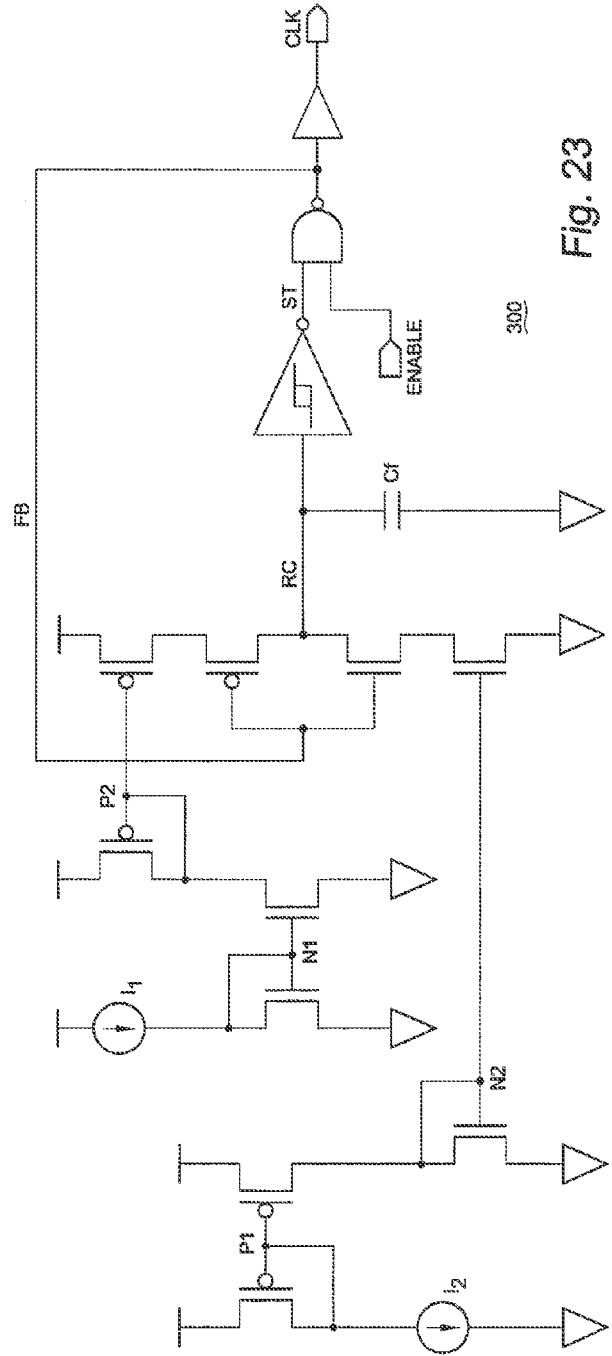
FIG. 23 is a representative schematic illustration of a ring oscillator circuit design for possible utilization with the representative embodiment of the present invention.

With reference additionally now to FIG. 23, a representative schematic illustration of a ring oscillator circuit 300 design for possible utilization with the representative embodiment of the present invention is shown.

This is a fairly standard three-stage ring oscillator using an inverting RC node followed by a Schmitt trigger and a third inverting stage formed by the NAND2 gate, which feeds back into the inverting RC node stage. Critical to this design though is using separate current mirrors for each instance of the oscillator to derive the current used for the current starved RC stage instead of a single mirror shared for all oscillators. The problem that this solves is that the oscillation noise can feedback into the high impedance current mirror stages which can cause the multiple instances of the oscillators to generate a harmonic response which can destroy the randomness trying to be achieved with these oscillators. Separate current mirrors break this feedback loop and allow all instances of the oscillator to operate independently. In addition, small device sizes are using the current mirrors to improve Device variability and to minimize the probability that two devices will behave identically.

Figure 24:
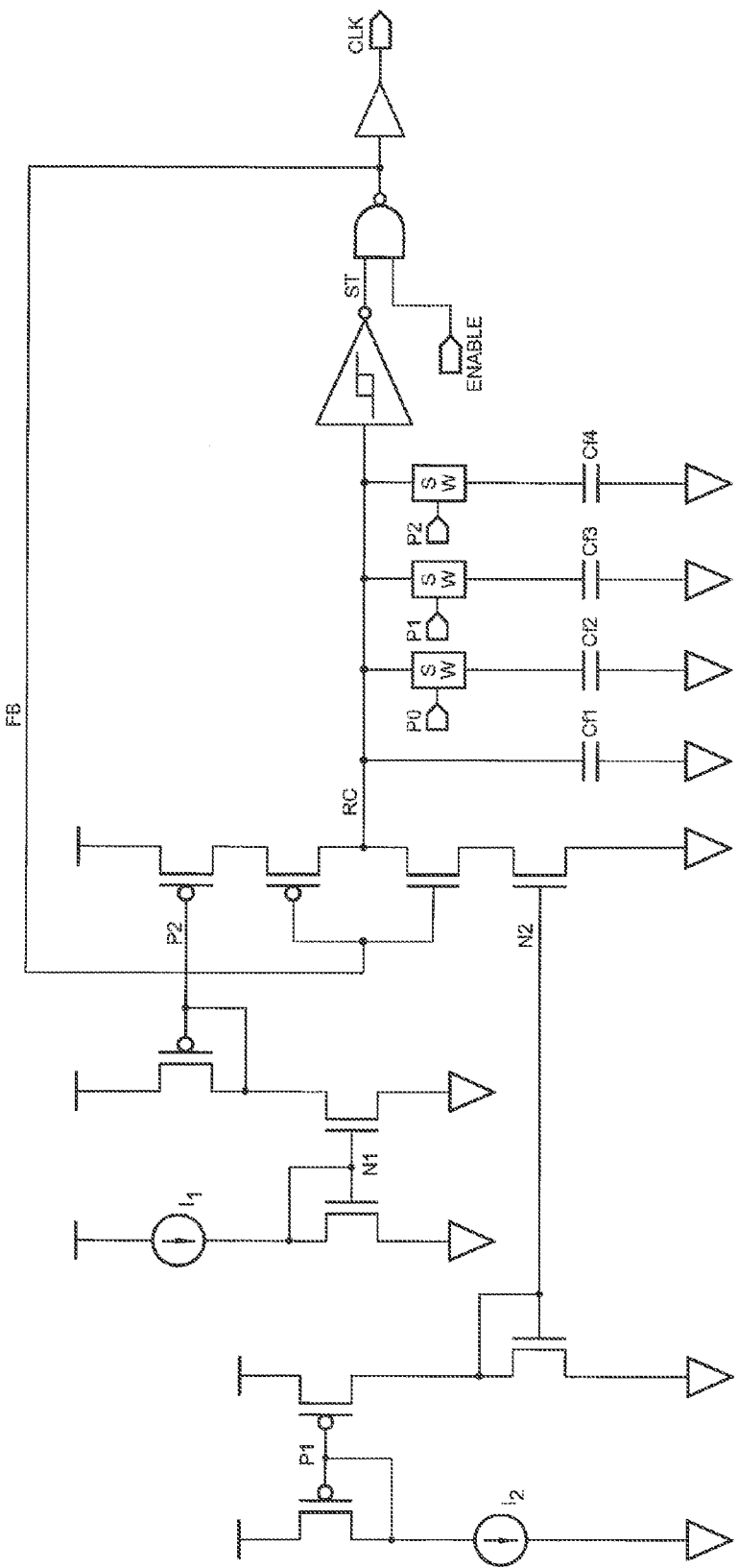
FIG. 24 is a representative schematic illustration of a variable frequency ring oscillator circuit design for possible utilization with the representative embodiment of the present invention.

With reference additionally now to FIG. 24, a representative schematic illustration of a variable frequency ring oscillator circuit 400 design for possible utilization with the representative embodiment of the present invention is shown.

This ring oscillator is similar to the previous oscillator except it contains three switched capacitors, Cf2, Cf3 and Cf4 which can alter the RC time constant dependent upon the state of the P0, P1 and P2 inputs. These inputs are tied to the output of the SBOX stage in FIG. 22 to generate the random switching between eight possible frequencies.

The output of the Variable Frequency Ring Oscillator is used to couple noise into a Noise Coupled Slow Ring Oscillator as will be described in more detail hereinafter.

Figure 25:
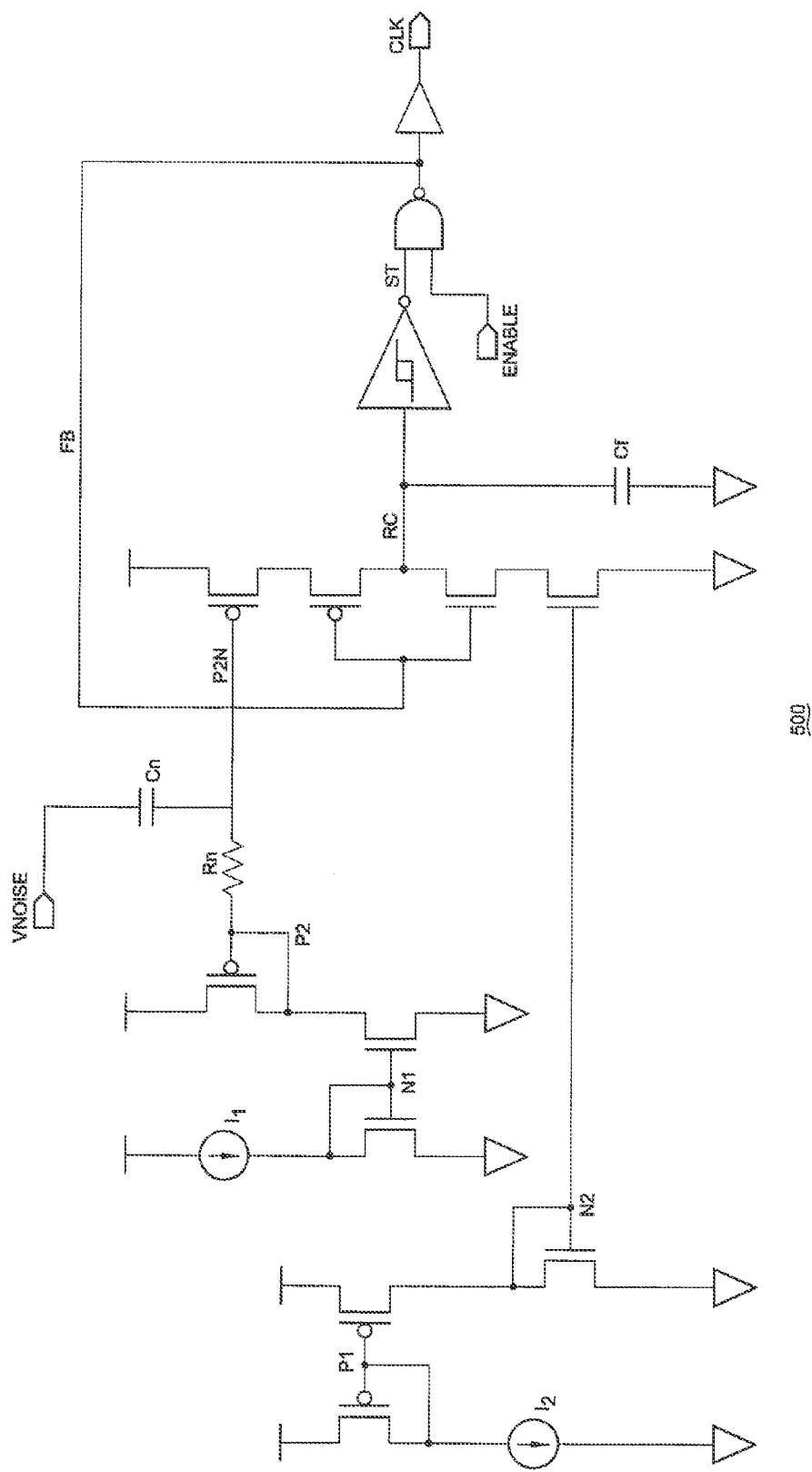
FIG. 25 is a representative schematic illustration of a noise coupled slow ring oscillator circuit design for possible utilization with the representative embodiment of the present invention.

With reference additionally now to FIG. 25, a representative schematic illustration of a noise coupled slow ring oscillator circuit 500 design for possible utilization with the representative embodiment of the present invention is shown.

This oscillator resistively isolates the P2 current mirror from the p-channel gate of the current starved inverter, node P2N. A capacitor then couples the output of the Variable Frequency Ring Oscillator into the resistively isolated P2N node. This will affect the charge rate of the RC node as the VNOISE input moves high and low, introducing a significant amount of jitter to the output of this clock. This clock is then used to capture the state of Fast Ring Oscillator 2 to generate a high rate of metastability to improve randomness of the system.

While there have been described above the principles of the present invention in conjunction with specific device structure, functional blocks, algorithms and circuitry, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

The invention claimed is:

1. A memory device comprising:
a ferroelectric memory array comprising a user memory space;
control logic configured to provide external read and write access for a host system to the user memory space upon authentication between the host system and the memory device;
address, data and control buses through which the host system accesses the user memory space and communicates with the control logic;
a memory interface configured to interface between the address, data and control buses and the control logic, and through which the host system communicates with the control logic;
a gate interposed on the address, data and control buses operable by the control logic for selectively providing or inhibiting the external read and write access to the user memory space; and
a cipher engine in communication with the control logic and the memory interface, the cipher engine comprising a hardware random number generator and an encryption/decryption block.

2. The memory device of claim 1 wherein the control logic comprises a memory access state machine operable to control the gate.

3. The memory device of claim 2 wherein the cipher engine and the control logic are operative in conjunction with critical security parameters stored in a configuration memory space of the ferroelectric memory array to establish the authentication between the host system and the memory device.

4. The memory device of claim 3 wherein the control logic comprises an authentication state machine coupling the memory interface to the memory access state machine, the authentication state machine being responsive to the cipher engine and at least one counter.

5. The memory device of claim 3 wherein the control logic comprises a critical security parameter update state machine coupling the memory interface to the memory access state machine, the critical security parameter update state machine being responsive to the cipher engine.

6. The memory device of claim 1 further comprising a register map comprising the memory interface.

7. The memory device of claim 6 wherein the register map further comprises a number of registers including an Authentication Data Buffer, an Administrator Register, a Control Register, a Lock register, a Fail Counter Register or a Status Register.

8. A radio frequency identification (RFID) system comprising:
a host system; and
a memory device comprising:
a ferroelectric memory array comprising a user memory space;
control logic configured to provide external read and write access for the host system to the user memory space upon authentication between the host system and the memory device;
address, data and control buses through which the host system accesses the user memory space and communicates with the control logic;
a memory interface configured to interface between the address, data and control buses and the control logic, and through which the host system communicates with the control logic;

a gate interposed on the address, data and control buses operable by the control logic for selectively providing or inhibiting the external read and write access to the user memory space; and a cipher engine in communication with the control logic and the memory interface, the cipher engine comprising a hardware random number generator and an encryption/decryption block.

9. The RFID system of claim 8 wherein the memory device further comprises a register map comprising the memory interface.

10. The RFID system of claim 9 wherein the host system and memory device are configured to communicate using wireless radio-frequency communication.

11. A method comprising:

providing a memory device including a ferroelectric memory array comprising a user memory space;

providing control logic configured to provide external read and write access for a host system to the user memory space upon authentication between the host system and the memory device;

communicating between the control logic and the host system through address, data and control buses and a memory interface in the memory device configured to interface between the address, data and control buses and the control logic;

wherein a gate interposed on the address, data and control buses is operable by the control logic for selectively providing or inhibiting the external read and write access to the user memory space;

communicating between the control logic, the memory interface, and a cipher engine in the memory device comprising a hardware random number generator and an encryption/decryption block; and accessing the user memory space through address, data and control buses upon authentication between the host system and the memory device.

12. The method of claim 11 wherein the host system and memory device communicate using wireless radio-frequency communication.

13. The method of claim 11 wherein the memory device further comprises a register map comprising the memory interface.

14. The method of claim 13 further comprising interposing a gate on the address, data and control buses operable by the control logic; and selectively providing or inhibiting the external read and write access to the user memory space in response to a state of the gate.

15. The method of claim 14 wherein the ferroelectric memory array further comprises configuration memory space, and further comprising establishing the authentication between the host system and the memory device in response to the cipher engine being operable in conjunction with critical security parameters stored in the configuration memory space of the ferroelectric memory array.

16. The method of claim 15 comprising controlling the gate in response to a memory access state machine forming a portion of the control logic.

17. The method of claim 16 comprising coupling the register map to the memory access state machine by an authentication state machine responsive to the cipher engine and at least one counter.

18. The method of claim 17 wherein the authentication state machine is responsive to a memory access or authentication counter.

19. The method of claim 15 comprising coupling the register map to the memory access state machine by an authentication state machine responsive to the cipher engine and at least one timer.

* * * * *